US006881359B2

(12) United States Patent
Leeners et al.

(10) Patent No.: US 6,881,359 B2
(45) Date of Patent: Apr. 19, 2005

(54) PROCESSES FOR THE PREPARATION OF LOW DUST, LIMITED PARTICLE SIZE DISTRIBUTION, SURFACTANT GRANULES

(75) Inventors: Bernhard Leeners, Erkelenz (DE); Udo Steinberner, Hilden (DE); Bernd Fabry, Korschenbroich (DE)

(73) Assignee: Cognis Deutschland GmbH & Co. KG, Duesseldorf (DE)

( * ) Notice: Subject to any disclaimer, the term of this patent is extended or adjusted under 35 U.S.C. 154(b) by 306 days.

(21) Appl. No.: 10/182,292

(22) PCT Filed: Jan. 17, 2001

(86) PCT No.: PCT/EP01/00469

§ 371 (c)(1), (2), (4) Date: Oct. 28, 2002

(87) PCT Pub. No.: WO01/55284

PCT Pub. Date: Aug. 2, 2001

(65) Prior Publication Data

US 2003/0102584 A1 Jun. 5, 2003

(30) Foreign Application Priority Data

Jan. 26, 2000 (DE) ........................................ 100 03 124

(51) Int. Cl.$^7$ .................................................. B29B 9/10

(52) U.S. Cl. ............................ 264/9; 264/14; 510/535; 159/47.1

(58) Field of Search ................................ 510/535, 536, 510/537; 264/9, 14; 425/10; 159/47.1, 48

(56) References Cited

U.S. PATENT DOCUMENTS

| | | | | |
|---|---|---|---|---|
| 2,968,833 A | * | 1/1961 | De Haven et al. | 264/9 |
| 3,373,232 A | * | 3/1968 | Wise et al. | 264/9 |
| 3,390,835 A | * | 7/1968 | Harris | 239/4 |
| 3,463,842 A | * | 8/1969 | Flack et al. | 264/0.5 |
| 3,966,629 A | | 6/1976 | Dumbrell | 252/140 |
| 4,062,647 A | | 12/1977 | Storm et al. | 8/137 |
| 4,154,379 A | * | 5/1979 | Schermutzki | 222/420 |
| 4,524,009 A | | 6/1985 | Valenty | 252/89.1 |
| 4,639,325 A | | 1/1987 | Valenty et al. | 252/89.1 |
| 4,737,306 A | | 4/1988 | Wichelhaus et al. | 252/95 |
| 4,816,553 A | | 3/1989 | Baur et al. | 528/245 |
| 4,820,439 A | | 4/1989 | Rieck | 252/135 |
| 4,985,553 A | | 1/1991 | Fuertes et al. | 536/124 |
| 5,002,695 A | | 3/1991 | Schulz et al. | 252/321 |
| 5,374,716 A | | 12/1994 | Biermann et al. | 536/18.6 |
| 5,382,377 A | | 1/1995 | Raehse et al. | 252/174 |
| 5,412,136 A | | 5/1995 | Stehr et al. | 558/43 |
| 5,417,951 A | | 5/1995 | Just | 423/334 |
| 5,431,780 A | | 7/1995 | Raehse et al. | 159/48.1 |
| 5,494,488 A | | 2/1996 | Arnoldi et al. | 8/137 |
| 5,501,814 A | | 3/1996 | Engelskirchen et al. | 252/174.17 |
| 5,536,430 A | | 7/1996 | Fues et al. | 510/535 |
| 5,541,316 A | | 7/1996 | Engelskirchen et al. | 510/471 |
| 5,576,425 A | | 11/1996 | Hill et al. | 536/18.6 |
| 5,637,560 A | | 6/1997 | Raehse et al. | 510/443 |
| 5,780,420 A | | 7/1998 | Breuer et al. | 510/466 |
| 5,821,360 A | | 10/1998 | Engelskirchen et al. | 536/124 |
| 5,830,956 A | | 11/1998 | Stockhausen et al. | 526/318.2 |
| 5,854,321 A | | 12/1998 | Krause et al. | 524/58 |
| 5,959,101 A | | 9/1999 | Engelskirchen et al. | 536/124 |
| 6,075,001 A | | 6/2000 | Wilde | 510/376 |
| 6,140,302 A | * | 10/2000 | Lueder et al. | 510/444 |
| 6,153,576 A | | 11/2000 | Blum et al. | 510/311 |
| 6,187,055 B1 | | 2/2001 | Kottwitz et al. | 8/137 |
| 6,200,946 B1 | | 3/2001 | Blum et al. | 510/372 |
| 6,362,157 B1 | | 3/2002 | Blochwitz et al. | 510/444 |

FOREIGN PATENT DOCUMENTS

| | | | |
|---|---|---|---|
| DE | 2 334 899 | A | 1/1974 |
| DE | 25 53 900 | A1 | 6/1977 |
| DE | 35 26 405 | A1 | 2/1987 |
| DE | 38 16 842 | A1 | 11/1989 |
| DE | 40 30 688 | A1 | 4/1992 |
| DE | 42 04 035 | A1 | 8/1993 |
| DE | 42 04 090 | A1 | 8/1993 |
| DE | 42 06 050 | A1 | 9/1993 |
| DE | 42 06 495 | A1 | 9/1993 |
| DE | 42 06 521 | A1 | 9/1993 |
| DE | 42 08 773 | A1 | 9/1993 |
| DE | 42 09 432 | A1 | 9/1993 |
| DE | 42 21 381 | C1 | 2/1994 |
| DE | 42 27 210 | A1 | 2/1994 |
| DE | 42 34 376 | A1 | 4/1994 |
| DE | 43 00 772 | A1 | 7/1994 |
| DE | 43 03 320 | A1 | 8/1994 |
| DE | 43 38 212 | A1 | 5/1995 |
| DE | 44 00 024 | A1 | 7/1995 |
| DE | 44 16 438 | A1 | 11/1995 |
| DE | 44 17 734 | A1 | 11/1995 |
| DE | 44 25 968 | A1 | 2/1996 |
| DE | 44 43 177 | A1 | 6/1996 |
| DE | 195 24 287 | A1 | 1/1997 |
| DE | 195 29 905 | A1 | 2/1997 |
| DE | 195 36 082 | A1 | 4/1997 |
| DE | 195 47 457 | A1 | 6/1997 |
| DE | 196 00 018 | A1 | 7/1997 |
| DE | 196 05 688 | A1 | 8/1997 |

(Continued)

OTHER PUBLICATIONS

R.C. MacKenzie and B.D. Mitchell, "Differential Thermal Analysis, A Review", The Analyst, vol. 87, (Jun., 1962), pp. 420–434.

"Tablettensprengmittel", Römpp Chemilexikon, 9th Ed., vol. 6, (1972), p. 4440.

Voigt, "Lehrbuch der pharmazeutischen Technologie", 6th Ed., (1987), pp. 182–184.

*Primary Examiner*—Mary Lynn Theisen
(74) *Attorney, Agent, or Firm*—Aaron R. Ettelman

(57) ABSTRACT

Processes for preparing surfactant granules, wherein the processes comprise: (a) passing a water-containing surfactant preparation through a casting plate, wherein the casting plate vibrates, such that droplets of the preparation are formed; and (b) contacting the droplets with a gaseous drying agent; are described.

14 Claims, No Drawings

FOREIGN PATENT DOCUMENTS

| | | | |
|---|---|---|---|
| DE | 196 13 103 | A1 | 10/1997 |
| DE | 196 20 411 | A1 | 10/1997 |
| DE | 196 16 693 | A1 | 11/1997 |
| DE | 196 16 767 | A1 | 11/1997 |
| DE | 196 16 769 | A1 | 11/1997 |
| DE | 196 16 770 | A1 | 11/1997 |
| DE | 196 20 267 | A1 | 11/1997 |
| DE | 197 09 991 | A1 | 9/1998 |
| DE | 197 10 254 | A1 | 9/1998 |
| DE | 197 50 424 | A1 | 5/1999 |
| EP | 0 026 529 | A1 | 4/1981 |
| EP | 0 028 432 | A1 | 5/1981 |
| EP | 0 150 930 | A2 | 8/1985 |
| EP | 0 164 514 | A1 | 12/1985 |
| EP | 0 232 202 | A2 | 8/1987 |
| EP | 0 272 030 | A2 | 6/1988 |
| EP | 0 280 223 | A2 | 8/1988 |
| EP | 0 301 298 | B1 | 2/1989 |
| EP | 0 309 931 | B1 | 4/1989 |
| EP | 0 380 275 | B1 | 8/1990 |
| EP | 0 392 592 | A2 | 10/1990 |
| EP | 0 427 349 | A2 | 5/1991 |
| EP | 0 443 651 | B1 | 8/1991 |
| EP | 0 446 982 | B1 | 9/1991 |
| EP | 0 453 003 | B1 | 10/1991 |
| EP | 0 458 397 | A2 | 11/1991 |
| EP | 0 458 398 | A2 | 11/1991 |
| EP | 0 472 042 | A1 | 2/1992 |
| EP | 0 486 592 | B1 | 5/1992 |
| EP | 0 496 510 | A1 | 7/1992 |
| EP | 0 525 239 | A1 | 2/1993 |
| EP | 0 542 496 | A1 | 5/1993 |
| EP | 0 544 490 | A1 | 6/1993 |
| EP | 0 544 519 | A2 | 6/1993 |
| EP | 0 549 271 | A1 | 6/1993 |
| EP | 0 549 272 | A1 | 6/1993 |
| EP | 0 693 550 | A2 | 1/1996 |
| EP | 0 703 292 | B1 | 3/1996 |
| EP | 0 939 287 | A1 | 9/1999 |
| GB | 1 400 898 | A | 7/1975 |
| GB | 94 19 091 | A1 | 9/1994 |
| JP | 93/339896 | A | 12/1993 |
| WO | WO 90/03977 | A1 | 4/1990 |
| WO | WO 91/08171 | A1 | 6/1991 |
| WO | WO 92/18542 | A1 | 10/1992 |
| WO | WO 93/02176 | A1 | 2/1993 |
| WO | WO 93/08251 | A1 | 4/1993 |
| WO | WO 93/16110 | A1 | 8/1993 |
| WO | WO 94/09111 | A1 | 4/1994 |
| WO | WO 94/27970 | A1 | 12/1994 |
| WO | WO 94/28030 | A1 | 12/1994 |
| WO | WO 94/28102 | A1 | 12/1994 |
| WO | WO 94/28103 | A1 | 12/1994 |
| WO | WO 95/00626 | A1 | 1/1995 |
| WO | WO 95/07303 | A1 | 3/1995 |
| WO | WO 95/12619 | A1 | 5/1995 |
| WO | WO 95/14075 | A1 | 5/1995 |
| WO | WO 95/14759 | A1 | 6/1995 |
| WO | WO 95/17498 | A1 | 6/1995 |
| WO | WO 95/20029 | A1 | 7/1995 |
| WO | WO 95/20608 | A1 | 8/1995 |
| WO | WO 95/27775 | A1 | 10/1995 |
| WO | WO 98/12299 | A1 | 3/1998 |
| WO | WO 98/40462 | A1 | 9/1998 |
| WO | WO 98/40463 | A1 | 9/1998 |
| WO | WO 98/55583 | A1 | 12/1998 |
| WO | WO 98/55590 | A1 | 12/1998 |

* cited by examiner

PROCESSES FOR THE PREPARATION OF LOW DUST, LIMITED PARTICLE SIZE DISTRIBUTION, SURFACTANT GRANULES

BACKGROUND OF THE INVENTION

Surfactants, such as alkyl benzenesulfonates or alkyl sulfates for example, are normally made up in solid form by spraying the raw materials in the form of aqueous solutions or pastes through nozzles into a tower, the droplets formed encountering hot air flowing in countercurrent. The fatty compounds crystallize during their free fall in countercurrent to the hot air and are normally continuously discharged as an end product from the conical lower part of the spray tower. The drying air charged with organic material is passed through cyclones to separate the fine particles entrained. A fan transports the main stream back into the spray tower in a circuit via the cooler. A part stream is generally passed via the waste air system to the boiler house while the fresh air stream required is taken in from the surrounding atmosphere.

Several one-component pressure nozzles, for example so-called solid-cone nozzles, are normally installed in the head of the spray towers. The product is sprayed through these nozzles into the spray tower. The jet issuing from the nozzle with high turbulence breaks up after only a short distance from the nozzle orifice and forms droplets, the break-up of the jet being additionally intensified by its spin. The powder produced in this way has a broad particle size distribution. On account of the fine dust accumulating and the danger of dust explosions, spray installations of the type in question are subject to the broader obligations of so-called malfunction operation which imposes stringent works safety requirements and adds to the cost of the production process.

Accordingly, there is a considerable demand among detergent manufacturers for a process which would allow the production of surfactant granules with a limited particle size distribution, more particularly with a negligible fine particle or dust component (<0.5 mm) of less than 1% by weight. At the same time, the surfactant granules would be distinguished by an improved dissolving rate.

Accordingly, the problem addressed by the invention was to provide a new process for the production of surfactant granules which would be free from the above-mentioned disadvantages.

BRIEF SUMMARY OF THE INVENTION

The present invention relates, in general, to surface-active compositions and more particularly to a new spray crystallization process for the production of surfactant granules with a limited particle size distribution.

The present invention relates to a process for the production of surfactant granules in which a stream of a water-containing surfactant preparation is converted into droplets by a vibrating casting plate and a gaseous drying agent is blown against the drops, evaporating the water present and drying the granules in the process.

It has surprisingly been found that the problem stated above can be solved by modified droplet formation. To this end, the surfactants are introduced into the spray tower in the form of aqueous solutions or pastes through a vibrating perforated plate. The vibration acting on the liquid imposes a frequency thereon so that the strand of liquid is repeatedly interrupted and, under the effect of the interfacial tension, microspheres are formed and enter the actual spray tower and are then dried during their free fall, for example by a hot gas flowing in countercurrent. A particular particle size distribution with no dust component can be adjusted in dependence upon the perforation diameter and the vibration frequency. Accordingly, an installation of the type in question is no longer subject to the broader obligations of malfunction operation which leads to a drastic reduction in the equipment required and the costs involved. Another unexpected advantage is that the surfactant granules have an improved dissolving rate which they pass on to the final preparations produced with them, preferably solid detergents and especially detergent tablets.

DETAILED DESCRIPTION OF THE INVENTION

Surfactants

Anionic, nonionic, cationic, amphoteric and/or zwitterionic surfactants are suitable for use in the process according to the invention, although anionic surfactants or combinations of anionic and nonionic surfactants are preferably used. Typical examples of anionic surfactants are soaps, alkyl benzenesulfonates, alkane sulfonates, olefin sulfonates, alkyl ether sulfonates, glycerol ether sulfonates, α-methyl ester sulfonates, sulfofatty acids, alkyl sulfates, fatty alcohol ether sulfates, glycerol ether sulfates, hydroxy mixed ether sulfates, monoglyceride (ether) sulfates, fatty acid amide (ether) sulfates, mono- and dialkyl sulfosuccinates, mono- and dialkyl sulfosuccinamates, sulfotriglycerides, amide soaps, ether carboxylic acids and salts thereof, fatty acid isethionates, fatty acid sarcosinates, fatty acid taurides, N-acyl amino acids such as, for example, acyl lactylates, acyl tartrates, acyl glutamates and acyl aspartates, alkyl oligoglucoside sulfates, protein fatty acid condensates (especially wheat-based vegetable products) and alkyl (ether)phosphates. If the anionic surfactants contain polyglycol ether chains, the polyglycol ether chains may have a conventional homolog distribution, although they preferably have a narrow homolog distribution. Alkyl benzenesulfonates, alkyl sulfates, alkyl ether sulfates, alkanesulfonates, olefin sulfonates, methyl ester sulfonates, monoglyceride (ether) sulfates and alkali soaps and mixtures thereof are preferably used.

Preferred alkyl benzenesulfonates preferably correspond to formula (I):

$$R^1—Ph—SO_3X \quad (I)$$

in which $R^1$ is a branched, but preferably linear alkyl group containing 10 to 18 carbon atoms, Ph is a phenyl group and X is an alkali metal and/or alkaline earth metal, ammonium, alkylammonium, alkanolammonium or glucammonium. Of these alkyl benzenesulfonates, dodecyl benzenesulfonates, tetradecyl benzenesulfonates, hexadecyl benzenesulfonates and technical mixtures thereof in the form of the sodium salts are particularly suitable.

Alkyl and/or alkenyl (ether) sulfates, which are also often referred to as fatty alcohol (ether) or oxoalcohol (ether) sulfates according to the raw material base, are understood to be the sulfation products of primary and/or secondary alcohols or of alkylene oxide adducts with such alcohols which preferably correspond to formula (II):

$$R^2O(CH_2CHR^3O)_a—SO_3X \quad (II)$$

in which $R^2$ is a linear or branched, aliphatic alkyl and/or alkenyl group containing 6 to 22 and preferably 12 to 18 carbon atoms, $R^3$ is hydrogen or a methyl group, a is 0 or a number of 1 to 0, preferably 2 to 10, and X is an alkali metal and/or alkaline earth metal, ammonium, alkylammonium, alkanolammonium or glucammonium. Typical examples of alkyl sulfates which may be used in accordance with the invention are the sulfation products of caproic alcohol, caprylic alcohol, capric alcohol, 2-ethylhexyl alcohol, lauryl alcohol, myristyl alcohol, cetyl alcohol, palmitoleyl alcohol, stearyl alcohol, isostearyl alcohol, oleyl alcohol, elaidyl alcohol, petroselinyl alcohol, arachyl alcohol, gadoleyl alcohol, behenyl alcohol and erucyl alcohol and the technical mixtures thereof obtained by high-pressure hydrogenation of technical methyl ester fractions or aldehydes from Roelen's oxosynthesis. Typical examples of alkyl ether sulfates are the sulfation products of addition products of on average 1 to 20 and preferably 2 to 10 mol ethylene and/or propylene oxide onto the above-mentioned alcohols. The sulfation products, i.e. both the sulfated alcohols and the sulfated alcohol polyglycol ethers, may advantageously be used in the form of their alkali metal salts, more especially their sodium salts. Alkyl (ether) sulfates based on $C_{16/18}$ tallow fatty alcohols or vegetable fatty alcohols with a comparable C-chain distribution in the form of their sodium salts are particularly preferred. In the case of branched primary types, the alcohols are oxoalcohols which are obtainable, for example, by reacting carbon monoxide and hydrogen on α-olefins by the Shop process. Corresponding alcohol mixtures are commercially available under the trade names of Dobanol® or Neodol®. Suitable alcohol mixtures are Dobanol 91®, 23®, 25® and 45®. Another possibility are the oxoalcohols obtained by the standard oxo process of Enichema or Condea in which carbon monoxide and hydrogen are added onto olefins. These alcohol mixtures are a mixture of highly branched alcohols and are commercially available under the name of Lial®. Suitable alcohol mixtures are Lial 91®, 111®, 123®, 125®, 145®.

Monoglyceride sulfates and monoglyceride ether sulfates are known anionic surfactants which may be obtained by the relevant methods of preparative organic chemistry. They are normally produced from triglycerides which, optionally after ethoxylation, are transesterified to the monoglycerides and then sulfated and neutralized. The partial glycerides may also be reacted with suitable sulfating agents, preferably gaseous sulfur trioxide or chlorosulfonic acid. If desired, the neutralized substances may be subjected to ultrafiltration to reduce the electrolyte content to a desired level. The monoglyceride (ether) sulfates to be used in accordance with the invention preferably correspond to formula (III):

(III)

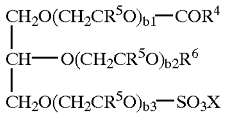

in which $R^4CO$ is a linear or branched acyl group containing 6 to 22 carbon atoms, $R^5$ is hydrogen or a methyl group, $R^6$ is hydrogen or has the same meaning as $R^4CO$, b1, b2 and b3 together have a value of 0 or 1 to 30 and preferably 2 to 10 and X is an alkali metal or alkaline earth metal. Typical examples of monoglyceride (ether) sulfates suitable for the purposes of the invention are the reaction products of lauric acid monoglyceride, coconut fatty acid monoglyceride, palmitic acid monoglyceride, stearic acid monoglyceride, oleic acid monoglyceride and tallow fatty acid monoglyceride and ethylene oxide adducts thereof with sulfur trioxide or chlorosulfonic acid in the form of their sodium salts. Monoglyceride sulfates corresponding to formula (III) in which $R^4CO$ is a linear acyl group containing 8 to 18 carbon atoms and $R^6$ stands for $R^4CO$ are preferably used.

Finally, alkali soaps are understood to be fatty acid salts corresponding to formula (IV):

$$R^7CO—OX \quad (IV)$$

in which $R^7CO$ is a linear or branched, saturated or unsaturated acyl group containing 6 to 22 and preferably 12 to 18 carbon atoms and X is alkali and/or alkaline earth metal, ammonium, alkylammonium or alkanolammonium. Typical examples are the sodium, potassium, magnesium, ammonium and triethanolammonium salts of caproic acid, caprylic acid, 2-ethylhexanoic acid, capric acid, lauric acid, isotridecanoic acid, myristic acid, palmitic acid, palmitoleic acid, stearic acid, isostearic acid, oleic acid, elaidic acid, petroselic acid, linoleic acid, linolenic acid, elaeostearic acid, arachic acid, gadoleic acid, behenic acid and erucic acid and technical mixtures thereof. Coconut oil fatty acid or palm kernel oil fatty acid in the form of their sodium or potassium salts are preferably used.

Typical examples of nonionic surfactants are fatty alcohol polyglycol ethers, alkylphenol polyglycol ethers, fatty acid polyglycol esters, fatty acid amide polyglycol ethers, fatty amine polyglycol ethers, alkoxylated triglycerides, mixed ethers and mixed formals, alk(en)yl oligoglycosides, fatty acid-N-alkyl glucamides, protein hydrolyzates (more particularly wheat-based vegetable products), polyol fatty acid esters, sugar esters, sorbitan esters, polysorbates and amine oxides. If the nonionic surfactants contain polyglycol ether chains, the polyglycol ether chains may have a conventional homolog distribution, although they preferably have a narrow homolog distribution. Fatty alcohol polyglycol ethers, alkoxylated fatty acid lower alkyl esters, alkyl oligoglycosides and/or fatty acid-N-alkyl polyhydroxyalkyl amides are preferably used.

Preferred fatty alcohol polyglycol ethers correspond to formula (V):

$$R^8O(CH_2CHR^9O)_{n1}H \quad (V)$$

in which $R^8$ is a linear or branched alkyl and/or alkenyl group containing 6 to 22 and preferably 12 to 18 carbon atoms, $R^9$ is hydrogen or methyl and n1 is a number of 1 to 20. Typical examples are products of the addition of, on average, 1 to 20 and preferably 5 to 10 mol of ethylene and/or propylene oxide onto caproic alcohol, caprylic alcohol, 2-ethylhexyl alcohol, capric alcohol, lauryl alcohol, isotridecyl alcohol, myristyl alcohol, cetyl alcohol, palmitoleyl alcohol, stearyl alcohol, isostearyl alcohol, oleyl alcohol, elaidyl alcohol, petroselinyl alcohol, linolyl alcohol, linolenyl alcohol, elaeostearyl alcohol, arachyl alcohol, gadoleyl alcohol, behenyl alcohol, erucyl alcohol and brassidyl alcohol and technical mixtures thereof. Products of the addition of 3, 5 or 7 mol of ethylene oxide onto technical cocofatty alcohols are particularly preferred.

Suitable alkoxylated fatty acid lower alkyl esters are surfactants corresponding to formula (VI):

$$R^{10}CO—(OCH_2CHR^{11})_{n2}OR^{12} \quad (VI)$$

in which $R^{10}CO$ is a linear or branched, saturated and/or unsaturated acyl group containing 6 to 22 carbon atoms, $R^{11}$ is hydrogen or methyl, $R^{12}$ is a linear or branched alkyl group containing 1 to 4 carbon atoms and n2 is a number of 1 to 20. Typical examples are the formal insertion products of, on average, 1 to 20 and preferably 5 to 10 mol of ethylene and/or propylene oxide into the methyl, ethyl, propyl, isopropyl, butyl and tert.butyl esters of caproic acid, caprylic acid, 2-ethylhexanoic acid, capric acid, lauric acid, isotridecanoic acid, myristic acid, palmitic acid, palmitoleic acid, stearic acid, isostearic acid, oleic acid, elaidic acid, petroselic acid, linoleic acid, linolenic acid, elaeostearic acid, arachic acid, gadoleic acid, behenic acid and erucic acid and technical mixtures thereof. The products are normally prepared by insertion of the alkylene oxides into the carbonyl ester bond in the presence of special catalysts, for example calcined hydrotalcite. Reaction products of on average 5 to 10 mol of ethylene oxide into the ester bond of technical cocofatty acid methyl esters are particularly preferred.

Alkyl and alkenyl oligoglycosides, which are also preferred nonionic surfactants, normally correspond to formula (VII):

$$R^{13}O\text{—}[G]_p \qquad \text{(VII)}$$

in which $R^{13}$ is an alkyl and/or alkenyl group containing 4 to 22 carbon atoms, G is a sugar unit containing 5 or 6 carbon atoms and p is a number of 1 to 10. They may be obtained by the relevant methods of preparative organic chemistry. EP 0 301 298 A1 and WO 90/03977 are cited as representative of the extensive literature available on the subject. The alkyl and/or alkenyl oligoglycosides may be derived from aldoses or ketoses containing 5 or 6 carbon atoms, preferably glucose. Accordingly, the preferred alkyl and/or alkenyl oligoglycosides are alkyl and/or alkenyl oligoglucosides. The index p in general formula (VII) indicates the degree of oligomerization (DP), i.e. the distribution of mono- and oligoglycosides, and is a number of 1 to 10. Whereas p in a given compound must always be an integer and, above all, may assume a value of 1 to 6, the value p for a certain alkyl oligoglycoside is an analytically determined calculated quantity which is generally a broken number. Alkyl and/or alkenyl oligoglycosides having an average degree of oligomerization p of 1.1 to 3.0 are preferably used. Alkyl and/or alkenyl oligoglycosides having a degree of oligomerization of less than 1.7 and, more particularly, between 1.2 and 1.4 are preferred from the applicational point of view. The alkyl or alkenyl radical $R^{13}$ may be derived from primary alcohols containing 4 to 11 and preferably 8 to 10 carbon atoms. Typical examples are butanol, caproic alcohol, caprylic alcohol, capric alcohol and undecyl alcohol and the technical mixtures thereof obtained, for example, in the hydrogenation of technical fatty acid methyl esters or in the hydrogenation of aldehydes from Roelen's oxosynthesis. Alkyl oligoglucosides having a chain length of $C_8$ to $C_{10}$ (DP=1 to 3), which are obtained as first runnings in the separation of technical $C_{8-18}$ coconut oil fatty alcohol by distillation and which may contain less than 6% by weight of $C_{12}$ alcohol as an impurity, and also alkyl oligoglucosides based on technical $C_{9/11}$ oxoalcohols (DP=1 to 3) are preferred. In addition, the alkyl or alkenyl radical $R^{13}$ may also be derived from primary alcohols containing 12 to 22 and preferably 12 to 14 carbon atoms. Typical examples are lauryl alcohol, myristyl alcohol, cetyl alcohol, palmitoleyl alcohol, stearyl alcohol, isostearyl alcohol, oleyl alcohol, elaidyl alcohol, petroselinyl alcohol, arachyl alcohol, gadoleyl alcohol, behenyl alcohol, erucyl alcohol, brassidyl alcohol and technical mixtures thereof which may be obtained as described above. Alkyl oligoglucosides based on hydrogenated $C_{12/14}$ cocoalcohol with a DP of 1 to 3 are preferred.

Typical examples of cationic surfactants are, in particular, tetraalkylammonium compounds such as, for example, dimethyl distearyl ammonium chloride or Hydroxyethyl Hydroxycetyl Dimmonium Chloride (Dehyquart E) and esterquats. Estersquats are, for example, quaternized fatty acid triethanolamine ester salts corresponding to formula (VIII):

(VIII)

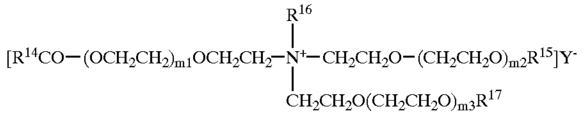

in which $R^{14}CO$ is an acyl group containing 6 to 22 carbon atoms, $R^{15}$ and $R^{16}$ independently of one another represent hydrogen or have the same meaning as $R^{14}CO$, $R^{15}$ is an alkyl group containing 1 to 4 carbon atoms or a $(CH_2CH_2O)_{m4}H$ group, m1, m2 and m3 together stand for 0 or numbers of 1 to 12, m4 is a number of 1 to 12 and Y is halide, alkyl sulfate or alkyl phosphate. Typical examples of esterquats which may be used in accordance with the invention are products based on caproic acid, caprylic acid, capric acid, lauric acid, myristic acid, palmitic acid, isostearic acid, stearic acid, oleic acid, elaidic acid, arachic acid, behenic acid and erucic acid and the technical mixtures thereof obtained for example in the pressure hydrolysis of natural fats and oils. Technical $C_{12/18}$ cocofatty acids and, in particular, partly hydrogenated $C_{16/18}$ tallow or palm oil fatty acids and high-elaidic $C_{16/18}$ fatty acid cuts are preferably used. To produce the quaternized esters, the fatty acids and the triethanolamine may be used in a molar ratio of 1.1:1 to 3:1. With the performance properties of the esterquats in mind, a ratio of 1.2:1 to 2.2:1 and preferably 1.5:1 to 1.9:1 has proved to be particularly advantageous. The preferred esterquats are technical mixtures of mono-, di- and triesters with an average degree of esterification of 1.5 to 1.9 and are derived from technical $C_{16/18}$ tallow or palm oil fatty acid (iodine value 0 to 40). In performance terms, quaternized fatty acid triethanolamine ester salts corresponding to formula (VIII), in which $R^{14}CO$ is an acyl group containing 16 to 18 carbon atoms, $R^{15}$ has the same meaning as $R^{15}CO$, $R^{16}$ is hydrogen, $R^{17}$ is a methyl group, m1, m2 and m3 stand for 0 and Y stands for methyl sulfate, have proved to be particularly advantageous.

Other suitable esterquats besides the quaternized fatty acid triethanolamine ester salts are quaternized ester salts of fatty acids with diethanolalkyamines corresponding to formula (IX):

(IX)

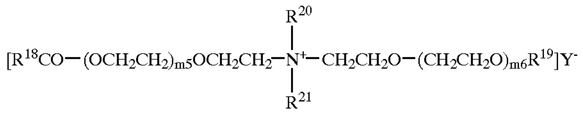

in which $R^{18}CO$ is an acyl group containing 6 to 22 carbon atoms, $R^{19}$ is hydrogen or has the same meaning as $R^{18}CO$, $R^{20}$ and $R^{21}$ independently of one another are alkyl groups containing 1 to 4 carbon atoms, m5 and m6 together stand for 0 or numbers of 1 to 12 and Y stands for halide, alkyl sulfate or alkyl phosphate.

Finally, another group of suitable esterquats are the quaternized ester salts of fatty acids with 1,2-dihydroxypropyl dialkylamines corresponding to formula (X):

(X)

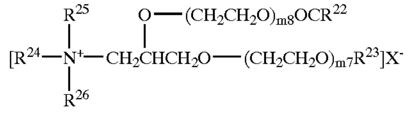

in which $R^{22}CO$ is an acyl group containing 6 to 22 carbon atoms, $R^{23}$ is hydrogen or has the same meaning as $R^{22}CO$, $R^{24}$, $R^{25}$ and $R^{26}$ independently of one another are alkyl groups containing 1 to 4 carbon atoms, m7 and m8 together stand for 0 or numbers of 1 to 12 and X stands for halide, alkyl sulfate or alkyl phosphate.

Finally, other suitable esterquats are substances in which the ester bond is replaced by an amide bond and which—preferably based on diethylenetriamine—correspond to formula (XI):

(XI)

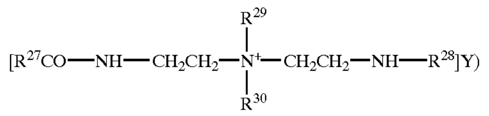

in which $R^{27}CO$ is an acyl group containing 6 to 22 carbon atoms, $R^{28}$ is hydrogen or has the same meaning as $R^{27}CO$, $R^{29}$ and $R^{30}$ independently of one another are alkyl groups containing 1 to 4 carbon atoms and Y is halide, alkyl sulfate or alkyl phosphate. Amide esterquats such as these are commercially obtainable, for example, under the name of Incroquat® (Croda).

Examples of suitable amphoteric or zwitterionic surfactants are alkyl betaines, alkyl amidobetaines, aminopropionates, aminoglycinates, imidazolinium betaines and sulfobetaines. Examples of suitable alkyl betaines are the carboxyalkylation products of secondary and, in particular, tertiary amines corresponding to formula (XII):

(XII)

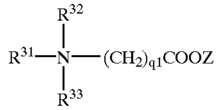

in which $R^{31}$ represents alkyl and/or alkenyl groups containing 6 to 22 carbon atoms, $R^{32}$ represents hydrogen or alkyl groups containing 1 to 4 carbon atoms, $R^{33}$ represents alkyl groups containing 1 to 4 carbon atoms, q1 is a number of 1 to 6 and Z is an alkali metal and/or alkaline earth metal or ammonium. Typical examples are the carboxymethylation products of hexylmethyl amine, hexyldimethyl amine, octyldimethyl amine, decyldimethyl amine, dodecylmethyl amine, dodecyldimethyl amine, dodecylethylmethyl amine, $C_{12/14}$ cocoalkyldimethyl amine, myristyldimethyl amine, cetyldimethyl amine, stearyldimethyl amine, stearylethylmethyl amine, oleyldimethyl amine, $C_{16/18}$ tallow alkyldimethyl amine and technical mixtures thereof.

Also suitable are carboxyalkylation products of amidoamines corresponding to formula (XIII):

(XIII)

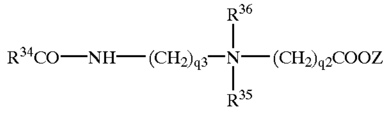

in which $R^{34}CO$ is an aliphatic acyl group containing 6 to 22 carbon atoms and 0 or 1 to 3 double bonds, $R^{35}$ is hydrogen or represents alkyl groups containing 1 to 4 carbon atoms, $R^{36}$ represents alkyl groups containing 1 to 4 carbon atoms, q2 is a number of 1 to 6, q3 is a number of 1 to 3 and Z is again an alkali metal and/or alkaline earth metal or ammonium. Typical examples are reaction products of fatty acids containing 6 to 22 carbon atoms, namely caproic acid, caprylic acid, capric acid, lauric acid, myristic acid, palmitic acid, palmitoleic acid, stearic acid, isostearic acid, oleic acid, elaidic acid, petroselic acid, linoleic acid, linolenic acid, elaeostearic acid, arachic acid, gadoleic acid, behenic acid and erucic acid and technical mixtures thereof, with N,N-dimethylaminoethyl amine, N,N-dimethylaminopropyl amine, N,N-diethylaminoethyl amine and N,N-diethylaminopropyl amine which are condensed with sodium chloroacetate. A condensation product of $C_{8/18}$-cocofatty acid-N,N-dimethylaminopropyl amide with sodium chloroacetate is preferably used.

Imidazolinium betaines may also be used. These compounds are also known compounds which may be obtained, for example, by cyclizing condensation of 1 or 2 mol of fatty acid with polyfunctional amines such as, for example, aminoethyl ethanolamine, (AEEA) or diethylenetriamine. The corresponding carboxyalkylation products are mixtures of different open-chain betaines. Typical examples are condensation products of the fatty acids mentioned above with AEEA, preferably imidazolines based on lauric acid or—again—$C_{12/14}$ cocofatty acid which are subsequently betainized with sodium chloroacetate.

Depending on the formation of liquid-crystalline or gel phases, i.e. on the pumpability of the surfactants, the surfactants are normally used in the form of aqueous solutions or pastes which have a solids content of 1 to 80% by weight, preferably 25 to 60% by weight and more particularly 30 to 50% by weight.

"Dropletization" Unit

The formation of droplets ("dropletization") by the process according to the invention using a vibrating casting plate is already known for the processing of synthetic waxes, resins and low-viscosity polyesters. Corresponding units are marketed, for example, by Rieter-Automatik under the name of "Droppo Line" for use in the textile industry. Casting plates in the form of perforated disks are preferably used, the droplets passing through the bores into the spray tower. These perforated disks preferably have an output of 100 to 800 kg/h and more particularly of the order of 500 kg/h, the diameter of the perforations being between 0.5 mm (mean granule diameter 0.8 mm) and 1.4 mm (mean granule diameter 2.5 mm). The vibration frequency imposed on the water-containing surfactant preparations is typically in the range from 100 to 1,000 Hz and preferably in the range from 500 to 800 Hz. Another advantage over conventional processes is that only a light excess pressure (typically 10 to 100 mbar) need be applied. Basically, drying in the spray tower may be carried out with hot air or hot combustion gases flowing in countercurrent at temperatures of, for example, 100 to 150° C., as adequately described in the prior art. The granules are substantially spherical and have mean diameters of 1 to 2.5 mm, depending on the perforation diameter of the perforated plate and the vibration frequency. The dust content, i.e. particles smaller than 0.5 mm in size, is substantially zero.

Commercial Applications

The surfactant granules obtainable by the process according to the invention may be mixed with other typical detergent ingredients such as, for example, builders, co-builders, oil- and fat-dissolving substances, bleaching agents, bleach activators, redeposition inhibitors, enzymes, enzyme stabilizers, optical brighteners, polymers, defoamers, disintegrators, perfumes, inorganic salts and the like and then made up into the corresponding end products. Accordingly, other additives and making-up processes are described in the following.

Builders

The laundry detergents, dishwashing detergents, cleaning compositions and conditioners according to the invention may also contain additional inorganic and organic builders, for example in quantities of 10 to 50 and preferably 15 to 35% by weight, based on the particular product, suitable inorganic builders mainly being zeolites, crystalline layer silicates, amorphous silicates and—where permitted—also phosphates such as, for example, tripolyphosphate. The quantity of co-builder should be included in the preferred quantities of phosphates.

The finely crystalline, synthetic zeolite containing bound water often used as a detergent builder is preferably zeolite A and/or zeolite P. Zeolite MAP® (Crosfield) is a particularly preferred P-type zeolite. However, zeolite X and mixtures of A, X and/or P and also Y are also suitable. A co-crystallized sodium/potassium aluminium silicate of zeolite A and zeolite X commercially available as VEGOBOND AX® (from Condea Augusta S.p.A.) is also of particular interest. The zeolite may be used in the form of a spray-dried powder or even in the form of an undried stabilized suspension still moist from its production. Where the zeolite is used in the form of a suspension, the suspension may contain small additions of nonionic surfactants as stabilizers, for example 1 to 3% by weight, based on zeolite, of ethoxylated $C_{12-18}$ fatty alcohols containing 2 to 5 ethylene oxide groups, $C_{12-14}$ fatty alcohols containing 4 to 5 ethylene oxide groups or ethoxylated isotridecanols. Suitable zeolites have a mean particle size of less than 10 $\mu$m (volume distribution, as measured by the Coulter Counter method) and contain preferably 18 to 22% by weight and more preferably 20 to 22% by weight of bound water.

Suitable substitutes or partial substitutes for phosphates and zeolites are crystalline layer sodium silicates corresponding to the general formula $NaMSi_xO_{2x+1}\square yH_2O$, where M is sodium or hydrogen, x is a number of 1.9 to 4 and y is a number of 0 to 20, preferred values for x being 2, 3 or 4. Crystalline layer silicates such as these are described, for example, in European patent application EP 0 164 514 A1. Preferred crystalline layer silicates corresponding to the above formula are those in which M is sodium and x assumes the value 2 or 3. Both β- and δ-sodium disilicates $Na_2Si_2O_5\square yH_2O$ are particularly preferred, β-sodium disilicate being obtainable, for example, by the process described in International patent application WO 91/08171. Other suitable layer silicates are known, for example, from patent applications DE 2334899 A1, EP 0026529 A1 and DE 3526405 A1. The suitability of these layer silicates is not limited to a particular composition or structural formula. However, smectites, more especially bentonites, are preferred for the purposes of the present invention. Suitable layer silicates which belong to the group of water-swellable smectites are, for example, those corresponding to the following general formulae:

$(OH)_4Si_{8-y}Al_y(Mg_xAl_{4-x})O_{20}$ montmorillonite $(OH)_4Si_{8-y}Al_y(Mg_{6-z}Li_z)O_{20}$ hectorite $(OH)_4Si_{8-y}Al_y(Mg_{6-z}Al_z)O_{20}$ saponite where x=0 to 4, y=0 to 2 and z=0 to 6. Small amounts of iron may additionally be incorporated in the crystal lattice of the layer silicates corresponding to the above formulae. In addition, by virtue of their ion-exchanging properties, the layer silicates may contain hydrogen, alkali metal and alkaline-earth metal ions, more particularly $Na^+$ and $Ca^{2+}$. The quantity of water of hydration is generally in the range from 8 to 20% by weight and is dependent upon the degree of swelling or upon the treatment method. Suitable layer silicates are known, for example, from U.S. Pat. No. 3,966,629 U.S. Pat. No. 4,062,647, EP 0026529 A1 and EP 0028432 A1. Layer silicates which, by virtue of an alkali treatment, are largely free from calcium ions and strongly coloring iron ions are preferably used.

Other preferred builders are amorphous sodium silicates with a modulus ($Na_2O$:$SiO_2$ ratio) of 1:2 to 1:3.3, preferably 1:2 to 1:2.8 and more preferably 1:2 to 1:2.6 which dissolve with delay and exhibit multiple wash cycle properties. The delay in dissolution in relation to conventional amorphous sodium silicates can have been obtained in various ways, for example by surface treatment, compounding, compacting or by overdrying. In the context of the invention, the term "amorphous" is also understood to encompass "X-ray amorphous". In other words, the silicates do not produce any of the sharp X-ray reflexes typical of crystalline substances in X-ray diffraction experiments, but at best one or more maxima of the scattered X-radiation which have a width of several degrees of the diffraction angle. Particularly good builder properties may even be achieved where the silicate particles produce crooked or even sharp diffraction maxima in electron diffraction experiments. This may be interpreted to mean that the products have microcrystalline regions between 10 and a few hundred nm in size, values of up to at most 50 nm and, more particularly, up to at most 20 nm being preferred. So-called X-ray amorphous silicates such as these, which also dissolve with delay in relation to conventional waterglasses, are described for example in German patent application DE-A-4400024 A1. Compacted amorphous silicates, compounded amorphous silicates and overdried X-ray-amorphous silicates are particularly preferred.

The generally known phosphates may of course also be used as builders providing their use should not be avoided on ecological grounds. The sodium salts of the orthophosphates, the pyrophosphates and, in particular, the tripolyphosphates are particularly suitable. Their content is generally no more than 25% by weight and preferably no more than 20% by weight, based on the final composition. In some cases, it has been found that, in combination with other builders, tripolyphosphates in particular produce a synergistic improvement in multiple wash cycle performance, even in small quantities of up to at most 10% by weight, based on the final composition.

Co-Builders

Useful organic builders suitable as co-builders are, for example, the polycarboxylic acids usable in the form of their sodium salts, such as citric acid, adipic acid, succinic acid, glutaric acid, tartaric acid, sugar acids, aminocarboxylic acids, nitrilotriacetic acid (NTA), providing its use is not ecologically unsafe, and mixtures thereof. Preferred salts are the salts of the polycarboxylic acids, such as citric acid, adipic acid, succinic acid, glutaric acid, tartaric acid, sugar acids and mixtures thereof. The acids per se may also be used. Besides their building effect, the acids also typically have the property of an acidifying component and, hence, also serve to establish a relatively low and mild pH value in detergents or cleaners. Citric acid, succinic acid, glutaric acid, adipic acid, gluconic acid and mixtures thereof are particularly mentioned in this regard.

Other suitable organic builders are dextrins, for example oligomers or polymers of carbohydrates which may be obtained by partial hydrolysis of starches. The hydrolysis may be carried out by standard methods, for example acid- or enzyme-catalyzed methods. The end products are preferably hydrolysis products with average molecular weights of 400 to 500,000. A polysaccharide with a dextrose equivalent (DE) of 0.5 to 40 and, more particularly, 2 to 30 is preferred, the DE being an accepted measure of the reducing effect of a polysaccharide by comparison with dextrose which has a DE of 100. Both maltodextrins with a DE of 3 to 20 and dry glucose syrups with a DE of 20 to 37 and also so-called yellow dextrins and white dextrins with relatively high molecular weights of 2,000 to 30,000 may be used. A preferred dextrin is described in British patent application 94 19 091 A1. The oxidized derivatives of such dextrins are their reaction products with oxidizing agents which are capable of oxidizing at least one alcohol function of the saccharide ring to the carboxylic acid function. Dextrins thus oxidized and processes for their production are known, for example, from European patent applications EP 0 232 202 A1, EP 0 427 349 A1, EP 0 472 042 A1 and EP 0 542 496 A1 and from International patent applications WO 92/18542, WO 93/08251, WO 93/16110, WO 94/28030, WO 95/07303, WO 95/12619 and WO 95/20608. An oxidized oligosaccharide corresponding to German patent application DE 196 00 018 A1 is also suitable. A product oxidized at $C_6$ of the saccharide ring can be particularly advantageous.

Other suitable co-builders are oxydisuccinates and other derivatives of disuccinates, preferably ethylenediamine disuccinate. The glycerol disuccinates and glycerol trisuccinates described, for example, in U.S. Pat. No. 4,524,009, in U.S. Pat. No. 4,639,325, in European patent application EP 0 150 930 A1 and in Japanese patent application JP 93/339896 are also particularly preferred in this connection. The quantities used in zeolite-containing and/or silicate-containing formulations are from 3 to 15% by weight. Other useful organic co-builders are, for example, acetylated hydroxycarboxylic acids and salts thereof which may optionally be present in lactone form and which contain at least 4 carbon atoms, at least one hydroxy group and at most two acid groups. Co-builders such as these are described, for example, in International patent application WO 95/20029.

Suitable polymeric polycarboxylates are, for example, the sodium salts of polyacrylic acid or polymethacrylic acid, for example those with a relative molecular weight of 800 to 150,000 (based on acid and measured against polystyrenesulfonic acid). Suitable copolymeric polycarboxylates are, in particular, those of acrylic acid with methacrylic acid and of acrylic acid or methacrylic acid with maleic acid. Acrylic acid/maleic acid copolymers containing 50 to 90% by weight of acrylic acid and 50 to 10% by weight of maleic acid have proved to be particularly suitable. Their relative molecular weight, based on free acids, is generally in the range from 5,000 to 200,000, preferably in the range from 10,000 to 120,000 and more preferably in the range from 50,000 to 100,000 (as measured against polystyrenesulfonic acid). The (co)polymeric polycarboxylates may be used either as powders or as aqueous solutions, 20 to 55% by weight aqueous solutions being preferred. Granular polymers are generally added to basic granules of one or more types in a subsequent step. Also particularly preferred are biodegradable polymers of more than two different monomer units, for example those which contain salts of acrylic acid and maleic acid and vinyl alcohol or vinyl alcohol derivatives as monomers in accordance with DE 43 00 772 A1 or salts of acrylic acid and 2-alkylallyl sulfonic acid and sugar derivatives as monomers in accordance with DE 42 21 381 C2. Other preferred copolymers are those described in German patent applications DE 43 03 320 A1 and DE 44 17 734 A1 which preferably contain acrolein and acrylic acid/acrylic acid salts or acrolein and vinyl acetate as monomers. Other preferred builders are polymeric aminodicarboxylic acids, salts and precursors thereof. Polyaspartic acids and salts and derivatives thereof are particularly preferred.

Other suitable builders are polyacetals which may be obtained by reaction of dialdehydes with polyol carboxylic acids containing 5 to 7 carbon atoms and at least three hydroxyl groups, for example as described in European patent application EP 0 280 223 A1. Preferred polyacetals are obtained from dialdehydes, such as glyoxal, glutaraldehyde, terephthalaldehyde and mixtures thereof and from polyol carboxylic acids, such as gluconic acid and/or glucoheptonic acid.

Oil- and Fat Dissolving Components

In addition, the compositions may contain components with a positive effect on the removability of oil and fats from textiles by washing. Preferred oil- and fat-dissolving components include, for example, nonionic cellulose ethers, such as methyl cellulose and methyl hydroxypropyl cellulose containing 15 to 30% by weight of methoxyl groups and 1 to 15% by weight of hydroxypropoxyl groups, based on the nonionic cellulose ether, and the polymers of phthalic acid and/or terephthalic acid known from the prior art or derivatives thereof, more particularly polymers of ethylene terephthalates and/or polyethylene glycol terephthalates or anionically and/or nonionically modified derivatives thereof. Of these, the sulfonated derivatives of phthalic acid and terephthalic acid polymers are particularly preferred.

Bleaching Agents and Bleach Activators

Among the compounds yielding $H_2O_2$ in water which serve as bleaching agents, sodium perborate tetrahydrate and sodium perborate monohydrate are particularly important. Other useful bleaching agents are, for example, sodium percarbonate, peroxypyrophosphates, citrate perhydrates and $H_2O_2$-yielding peracidic salts or peracids, such as perbenzoates, peroxophthalates, diperazelaic acid, phthaloiminoperacid or diperdodecanedioic acid. The content of peroxy bleaching agents in the detergents/cleaning compositions is preferably 5 to 35% by weight and more preferably up to 30% by weight, perborate monohydrate or percarbonate advantageously being used.

Suitable bleach activators are compounds which form aliphatic peroxocarboxylic acids containing preferably 1 to 10 carbon atoms and more preferably 2 to 4 carbon atoms and/or optionally substituted perbenzoic acid under perhydrolysis conditions. Substances bearing O- and/or N-acyl groups with the number of carbon atoms mentioned and/or optionally substituted benzoyl groups are suitable. Preferred bleach activators are polyacylated alkylenediamines, more particularly tetraacetyl ethylenediamine (TAED), acylated triazine derivatives, more particularly 1,5-diacetyl-2,4-dioxohexahydro-1,3,5-triazine (DADHT), acylated glycolurils, more particularly tetraacetyl glycoluril (TAGU), N-acylimides, more particularly N-nonanoyl succinimide (NOSI), acylated phenol sulfonates, more particularly n-nonanoyl or isononanoyloxybenzenesulfonate (n- or iso- NOBS), carboxylic anhydrides, more particularly phthalic anhydride, acylated polyhydric alcohols, more particularly triacetin, ethylene glycol diacetate, 2,5-diacetoxy-2,5-dihydrofuran and the enol esters known from German patent applications DE 196 16 693 A1 and DE 196 16 767 A1, acetylated sorbitol and mannitol and the mixtures thereof (SORMAN) described in European patent application EP 0 525 239 A1, acylated sugar derivatives, more particularly pentaacetyl glucose (PAG), pentaacetyl fructose, tetraacetyl xylose and octaacetyl lactose, and acetylated, optionally N-alkylated glucamine and gluconolactone, and/or N-acylated lactams, for example N-benzoyl caprolactam, which are known from International patent applications WO 94/27970, WO 94/28102, WO 94/28103, WO 95/00626, WO 95/14759 and WO 95/17498. The substituted hydrophilic acyl acetals known from German patent application DE 196 16 769 A1 and the acyl lactams described in German patent application DE 196 16 770 and in International patent application WO 95/14075 are also preferably used. The combinations of conventional bleach activators known from German patent application DE 44 43 177 A1 may also be used. Bleach activators such as these are present in the usual quantities, preferably in quantities of 1% by weight to 10% by weight and more preferably in quantities of 2% by weight to 8% by weight, based on the detergent/cleaning composition as a whole. In addition to or instead of the conventional bleach activators mentioned above, the sulfonimines known from European patents EP 0 446 982 B1 and EP 0 453 003 B1 and/or bleach-boosting transition metal salts or transition metal complexes may also be present as so-called bleach catalysts. Suitable transition metal compounds include, in particular, the manganese-, iron-, cobalt-, ruthenium- or molybdenum-salen complexes known from German patent application DE 195 29 905 A1 and the N-analog compounds thereof known from German patent application DE 196 20 267 A1, the manganese-, iron-, cobalt-, ruthenium- or molybdenum-carbonyl complexes known from German patent application DE 195 36 082 A1, the manganese, iron, cobalt, ruthenium, molybdenum, titanium, vanadium and copper complexes with nitrogen-containing tripod ligands described in German patent application DE 196 05 688 A1, the cobalt-, iron-, copper- and ruthenium-ammine complexes known from German patent application DE 196 20 411 A1, the manganese, copper and cobalt complexes described in German patent application DE 44 16 438 A1, the cobalt complexes described in European patent application EP 0 272 030 A1, the manganese complexes known from European patent application EP 0 693 550 A1, the manganese, iron, cobalt and copper complexes known from European patent EP 0 392 592 A1 and/or the manganese complexes described in European patent EP 0 443 651 B1 or in European patent applications EP 0 458 397 A1, EP 0 458 398 A1, EP 0 549 271 A1, EP 0 549 272 A1, EP 0 544 490 A1 and EP 0 544 519 A1. Combinations of bleach activators and transition metal bleach catalysts are known, for example, from German patent application DE 196 13 103 A1 and from international patent application WO 95/27775. Bleach-boosting transition metal complexes, more particularly with the central atoms Mn, Fe, Co. Cu, Mo. V, Ti and/or Ru, are used in typical quantities, preferably in a quantity of up to 1% by weight, more preferably in a quantity of 0.0025% by weight to 0.25% by weight and most preferably in a quantity of 0.01% by weight to 0.1% by weight, based on the detergent/cleaning composition as a whole.

Enzymes and Enzyme Stabilizers

Suitable enzymes are, in particular, enzymes from the class of hydrolases, such as proteases, esterases, lipases or lipolytic enzymes, amylases, cellulases or other glycosyl hydrolases and mixtures thereof. All these hydrolases contribute to the removal of stains, such as protein-containing, fat-containing or starch-containing stains, and discoloration in the washing process. Cellulases and other glycosyl hydrolases can contribute towards color retention and towards increasing fabric softness by removing pilling and microfibrils. Oxidoreductases may also be used for bleaching and for inhibiting dye transfer. Enzymes obtained from bacterial strains or fungi, such as *Bacillus subtilis, Bacillus licheniformis, Streptomyces griseus* and *Humicola insolens* are particularly suitable. Proteases of the subtilisin type are preferably used, proteases obtained from *Bacillus lentus* being particularly preferred. Of particular interest in this regard are enzyme mixtures, for example of protease and amylase or protease and lipase or lipolytic enzymes or protease and cellulase or of cellulase and lipase or lipolytic enzymes or of protease, amylase and lipase or lipolytic enzymes or protease, lipase or lipolytic enzymes and cellulase, but especially protease- and/or lipase-containing mixtures or mixtures with lipolytic enzymes. Examples of such lipolytic enzymes are the known cutinases. Peroxidases or oxidases have also been successfully used in some cases. Suitable amylases include in particular α-amylases, isoamylases, pullanases and pectinases. Preferred cellulases are cellobiohydrolases, endoglucanases and β-glucosidases, which are also known as cellobiases, and mixtures thereof. Since the various cellulase types differ in their CMCase and avicelase activities, the desired activities can be established by mixing the cellulases in the appropriate ratios. The enzymes may be adsorbed to supports and/or encapsulated in membrane materials to protect them against premature decomposition. The percentage content of enzymes, enzyme mixtures or enzyme granules may be, for example, about 0.1 to 5% by weight and is preferably from 0.1 to about 2% by weight.

In addition to the monohydric and polyhydric alcohols, the compositions may contain other enzyme stabilizers. For example, 0.5 to 1% by weight of sodium formate may be used. Proteases stabilized with soluble calcium salts and having a calcium content of preferably about 1.2% by weight, based on the enzyme, may also be used. Apart from calcium salts, magnesium salts also serve as stabilizers. However, it is of particular advantage to use boron compounds, for example boric acid, boron oxide, borax and other alkali metal borates, such as the salts of orthoboric acid ($H_3BO_3$), metaboric acid ($HBO_2$) and pyroboric acid (tetraboric acid $H_2B_4O_7$).

Redeposition Inhibitors

The function of redeposition inhibitors is to keep the soil detached from the fibers suspended in the wash liquor and thus to prevent the soil from being re-absorbed by the washing. Suitable redeposition inhibitors are water-soluble, generally organic colloids, for example the water-soluble salts of polymeric carboxylic acids, glue, gelatine, salts of ether carboxylic acids or ether sulfonic acids of starch or cellulose or salts of acidic sulfuric acid esters of cellulose or starch. Water-soluble polyamides containing acidic groups are also suitable for this purpose. Soluble starch preparations and other starch products than those mentioned above, for example degraded starch, aldehyde starches, etc., may also be used. Polyvinyl pyrrolidone is also suitable. However, cellulose ethers, such as carboxymethyl cellulose (sodium salt), methyl cellulose, hydroxyalkyl cellulose, and mixed ethers, such as methyl hydroxyethyl cellulose, methyl hydroxypropyl cellulose, methyl carboxymethyl cellulose and mixtures thereof, and polyvinyl pyrrolidone are also preferably used, for example in quantities of 0.1 to 5% by weight, based on the detergent/cleaning composition.

Optical Brighteners

The detergents/cleaning compositions may contain derivatives of diaminostilbene disulfonic acid or alkali metal salts thereof as optical brighteners. Suitable optical brighteners are, for example, salts of 4,4'-bis-(2-anilino-4-morpholino-1,3,5-triazinyl-6-amino)-stilbene-2,2'-disulfonic acid or compounds of similar structure which contain a diethanolamino group, a methylamino group and anilino group or a 2-methoxyethylamino group instead of the morpholino group. Brighteners of the substituted diphenyl styryl type, for example alkali metal salts of 4,4'-bis-(2-sulfostyryl)-diphenyl, 4,4'-bis-(4-chloro-3-sulfostyryl)-diphenyl or 4-(4-chlorostyryl)-4'-(2-sulfostyryl)-diphenyl, may also be present. Mixtures of the brighteners mentioned may also be used. Uniformly white granules are obtained if, in addition to the usual brighteners in the usual quantities, for example between 0.1 and 0.5% by weight and preferably between 0.1 and 0.3% by weight, the detergents/cleaning compositions also contain small quantities, for example $10^{-6}$ to $10^{-3}$% by weight and preferably around $10^{-5}$% by weight, of a blue dye. A particularly preferred dye is Tinolux® (a product of Ciba-Geigy).

Polymers

Suitable soil repellents are substances which preferably contain ethylene terephthalate and/or polyethylene glycol terephthalate groups, the molar ratio of ethylene terephthalate to polyethylene glycol terephthalate being in the range from 50:50 to 90:10. The molecular weight of the linking polyethylene glycol units is more particularly in the range from 750 to 5,000, i.e. the degree of ethoxylation of the polymers containing polyethylene glycol groups may be about 15 to 100. The polymers are distinguished by an average molecular weight of about 5,000 to 200,000 and may have a block structure, but preferably have a random structure. Preferred polymers are those with molar ethylene terephthalate: polyethylene glycol terephthalate ratios of about 65:35 to about 90:10 and preferably in the range from about 70:30 to 80:20. Other preferred polymers are those which contain linking polyethylene glycol units with a molecular weight of 750 to 5,000 and preferably in the range from 1,000 to about 3,000 and which have a molecular weight of the polymer of about 10,000 to about 50,000. Examples of commercially available polymers are the products Milease® T (ICI) or Repelotex® SRP 3 (Rhône-Poulenc).

Defoamers

Wax-like compounds may be used as defoamers. “Wax-like” compounds are understood to be compounds which have a melting point at atmospheric pressure above 25° C. (room temperature), preferably above 50° C. and more preferably above 70° C. The wax-like defoamers are substantially insoluble in water, i.e. their solubility in 100 g of water at 20° C. is less than 0.1% by weight. In principle, any wax-like defoamers known from the prior art may additionally be present. Suitable wax-like compounds are, for example, bisamides, fatty alcohols, fatty acids, carboxylic acid esters of monohydric and polyhydric alcohols and paraffin waxes or mixtures thereof. Alternatively, the silicone compounds known for this purpose may of course also be used.

Suitable paraffin waxes are generally a complex mixture with no clearly defined melting point. For characterization, its melting range is normally determined by differential thermoanalysis (DTA), as described in “The Analyst” 87 (1962), 420, and/or its solidification point is determined. The solidification point is understood to be the temperature at which the paraffin changes from the liquid state into the solid state by slow cooling. Paraffins which are entirely liquid at room temperature, i.e. paraffins with a solidification point below 25° C., are not suitable for use in accordance with the invention. Soft waxes which have a melting point of 35 to 50° C. preferably include the group of petrolates and hydrogenation products thereof. They are composed of microcrystalline paraffins and up to 70% by weight of oil, have an ointment-like to plastic, firm consistency and represent bitumen-free residues from the procesing of petroleum. Distillation residues (petrolatum stock) of certain paraffin-based and mixed-base crude oils further processed to Vaseline are particularly preferred. Bitumen-free oil-like to solid hydrocarbons separated from distillation residues of paraffin-based or mixed-base crude oil and cylinder oil distillates are also preferred. They are of semisolid, smooth, tacky to plastic and firm consistency and have melting points of 50 to 70°C. These petrolates are the most important starting materials for the production of microwaxes. The solid hydrocarbons with melting points of 63 to 79° C. separated from high-viscosity, paraffin-containing lubricating oil distillates during deparaffinization are also suitable. These petrolates are mixtures of microcrystalline waxes and high-melting n-paraffins. It is possible, for example, to use the paraffin wax mixtures known from EP 0309931 A1 of, for example, 26% by weight to 49% by weight of microcrystalline paraffin wax with a solidification point of 62° C. to 90° C., 20% by weight to 49% by weight of hard paraffin with a solidification point of 42° C. to 56° C. and 2% by weight to 25% by weight of soft paraffin with a solidification point of 35° C. to 40° C. Paraffins or paraffin mixtures which solidify at temperatures of 30° C. to 90° C. are preferably used. It is important in this connection to bear in mind that even paraffin wax mixtures which appear solid at room temperature may contain different amounts of liquid paraffin. In the paraffin waxes suitable for use in accordance with the invention, this liquid component is as small as possible and is preferably absent altogether. Thus, particularly preferred paraffin wax mixtures have a liquid component at 30° C. of less than 10% by weight and, more particularly, from 2% by weight to 5% by weight, a liquid component at 40° C. of less than 30% by weight, preferably from 5% by weight to 25% by weight and more preferably from 5% by weight to 15% by weight, a liquid component at 60° C. of 30% by weight to 60% by weight and preferably 40% by weight to 55% by weight, a liquid component at 80° C. of 80% by weight to 100% by weight and a liquid component at 90° C. of 100% by weight. In particularly preferred paraffin wax mixtures, the temperature at which a liquid component of 100% by weight of the paraffin wax is reached is still below 85° C. and, more particularly, between 75° C. and 82° C. The paraffin waxes may be petrolatum, microcrystalline waxes or hydrogenated or partly hydrogenated paraffin waxes.

Bisamides suitable as defoamers are those derived from saturated fatty acids containing 12 to 22 and preferably 14 to 18 carbon atoms and from alkylenediamines containing 2 to 7 carbon atoms. Suitable fatty acids are lauric acid, myristic acid, stearic acid, arachic acid and behenic acid and the mixtures thereof obtainable from natural fats or hydrogenated oils, such as tallow or hydrogenated palm oil. Suitable diamines are, for example, ethylenediamine, 1,3-propylenediamine, tetramethylenediamine, pentamethylenediamine, hexamethylenediamine, p-phenylenediamine and toluylenediamine. Preferred diamines are ethylenediamine and hexamethylenediamine.

Particularly preferred bisamides are bis-myristoyl ethylenediamine, bis-palmitoyl ethylenediamine, bis-stearoyl ethylenediamine and mixtures thereof and the corresponding derivatives of hexamethylenediamine.

Suitable carboxylic acid esters as defoamers are derived from carboxylic acids containing 12 to 28 carbon atoms. The esters in question are, in particular, esters of behenic acid, stearic acid, hydroxystearic acid, oleic acid, palmitic acid, myristic acid and/or lauric acid. The alcohol moiety of the carboxylic acid ester contains a monohydric or polyhydric alcohol containing 1 to 28 carbon atoms in the hydrocarbon chain. Examples of suitable alcohols are behenyl alcohol, arachidyl alcohol, cocoalcohol, 12-hydroxystearyl alcohol, oleyl alcohol and lauryl alcohol and ethylene glycol, glycerol, polyvinylvinyl alcohol, sucrose, erythritol, pentaerythritol, sorbitan and/or sorbitol. Preferred esters are esters of ethylene glycol, glycerol and sorbitan, the acid moiety of the ester being selected in particular from behenic acid, stearic acid, oleic acid, palmitic acid or myristic acid. Suitable esters of polyhydric alcohols are, for example, xylitol monopalmitate, pentaerythritol monostearate, glycerol monostearate, ethylene glycol monostearate and sorbitan monostearate, sorbitan palmitate, sorbitan monolaurate, sorbitan dilaurate, sorbitan distearate, sorbitan dibehenate, sorbitan dioleate and mixed tallow alkyl sorbitan monoesters and diesters. Suitable glycerol esters are the mono-, di- or triesters of glycerol and the carboxylic acids mentioned, the monoesters and diesters being preferred. Glycerol monostearate, glycerol monooleate, glycerol monopalmitate, glycerol monobehenate and glycerol distearate are examples. Examples of suitable natural esters as defoamers are beeswax, which mainly consists of the esters $CH_3(CH_2)_{24}COO(CH_2)_{27}CH_3$ and $CH_3(CH_2)_{26}COO(CH_2)_{25}CH_3$, and carnauba wax, carnauba wax being a mixture of carnauba acid alkyl esters, often in combination with small amounts of free carnauba acid, other long-chain acids, high molecular weight alcohols and hydrocarbons.

Suitable carboxylic acids as another defoamer compound are, in particular, behenic acid, stearic acid, oleic acid, palmitic acid, myristic acid and lauric acid and the mixtures thereof obtainable from natural fats or optionally hydrogenated oils, such as tallow or hydrogenated palm oil. Saturated fatty acids containing 12 to 22 and, more particularly, 18 to 22 carbon atoms are preferred. Similarly, the corresponding fatty alcohols with the same C chain length may be used.

Dialkyl ethers may also be present as defoamers. The ethers may have an asymmetrical or symmetrical structure, i.e. they may contain two identical or different alkyl chains, preferably containing 8 to 18 carbon atoms. Typical examples are di-n-octyl ether, di-i-octyl ether and di-n-stearyl ether, dialkyl ethers with a melting point above 25° C. and more particularly above 40° C. being particularly suitable.

Other suitable defoamer compounds are fatty ketones which may be obtained by the relevant methods of preparative organic chemistry. They are produced, for example, from carboxylic acid magnesium salts which are pyrolyzed at temperatures above 300° C. with elimination of carbon dioxide and water, for example in accordance with DE 2553900 OS. Suitable fatty ketones are produced by pyrolysis of the magnesium salts of lauric acid, myristic acid, palmitic aid, palmitoleic acid, stearic acid, oleic acid, elaidic acid, petroselic acid, arachic acid, gadoleic acid, behenic acid or erucic acid.

Other suitable defoamers are fatty acid polyethylene glycol esters which are preferably obtained by the homogeneously base-catalyzed addition of ethylene oxide onto fatty acids. The addition of ethylene oxide onto the fatty acids takes place in particular in the presence of alkanolamines as catalysts. The use of alkanolamines, especially triethanolamine, leads to extremely selective ethoxylation of the fatty acids, particularly where it is desired to produce compounds with a low degree of ethoxylation. Within the group of fatty acid polyethylene glycol esters, those with a melting point above 25° C. and more particularly above 40° C. are preferred.

Within the group of wax-like defoamers, the described paraffin waxes—in a particularly preferred embodiment—are used either on their own as wax-like defoamers or in admixture with one of the other wax-like defoamers, the percentage content of the paraffin waxes in the mixture preferably exceeding 50% by weight, based on the wax-like defoamer mixture. If necessary, the paraffin waxes may be applied to supports. Suitable support materials in the context of the present invention are any known inorganic and/or organic support materials. Examples of typical inorganic support materials are alkali metal carbonates, alumosilicates, water-soluble layer silicates, alkali metal silicates, alkali metal sulfates, for example sodium sulfate, and alkali metal phosphates. The alkali metal silicates are preferably a compound with a molar ratio of alkali metal oxide to $SiO_2$ of 1:1.5 to 1:3.5. The use of silicates such as these results in particularly good particle properties, more particularly high abrasion resistance and at the same time a high dissolving rate in water. Alumosilicates as a support material include, in particular, the zeolites, for example zeolite NaA and NaX. The compounds described as water-soluble layer silicates include, for example, amorphous or crystalline waterglass. Silicates commercially available as Aerosil® or Sipernat® may also be used. Suitable organic carrier materials are, for example, film-forming polymers, for example polyvinyl alcohols, polyvinyl pyrrolidones, poly(meth)acrylates, polycarboxylates, cellulose derivatives and starch. Suitable cellulose ethers are, in particular, alkali metal carboxymethyl cellulose, methyl cellulose, ethyl cellulose, hydroxyethyl cellulose and so-called cellulose mixed ethers, for example methyl hydroxyethyl cellulose and methyl hydroxypropyl cellulose, and mixtures thereof. Particularly suitable mixtures are mixtures of sodium carboxymethyl cellulose and methyl cellulose, the carboxymethyl cellulose normally having a degree of substitution of 0.5 to 0.8 carboxymethyl groups per anhydroglucose unit while the methyl cellulose has a degree of substitution of 1.2 to 2 methyl groups per anhydroglucose unit. The mixtures preferably contain alkali metal carboxymethyl cellulose and nonionic cellulose ether in ratios by weight of 80:20 to 40:60 and, more particularly, 75:25 to 50:50. Another suitable support is native starch which is made up of amylose and amylopectin. Native starch is starch obtainable as an extract from natural sources, for example from rice, potatoes, corn and wheat. Native starch is a standard commercial product and is therefore readily available. Suitable support materials are individual compounds or several of the compounds mentioned above selected in particular from the group of alkali metal carbonates, alkali metal sulfates, alkali metal phosphates, zeolites, water-soluble layer silicates, alkali metal silicates, polycarboxylates, cellulose ethers, polyacrylate/polymethacrylate and starch. Mixtures of alkali metal carbonates, more particularly sodium carbonate, alkali metal silicates, more particularly sodium silicate, alkali metal sulfates, more particularly sodium sulfate, and zeolites are particularly suitable.

Suitable silicones in the context of the present invention are typical organopolysiloxanes containing fine-particle silica which, in turn, may even be silanized. Corresponding organopolysiloxanes are described, for example, in European patent application EP 0 496 510 A1. Polydiorganosiloxanes and, in particular, polydimethylsiloxanes known from the prior art are particularly preferred. Suitable polydiorganosiloxanes have a substantially linear chain and a degree of oligomerization of 40 to 1,500. Examples of suitable substituents are methyl, ethyl, propyl, isobutyl, tert.butyl and phenyl. Amino-, fatty-acid-, alcohol-, polyether-, epoxy-, fluorine-, glycoside- and/or alkyl-modified silicone compounds which may be both liquid and resin-like at room temperature are also suitable, as are simethicones, i.e. mixtures of dimethicones with an average chain length of 200 to 300 dimethyl siloxane units and hydrogenated silicates. Normally, the silicones in general and the polydiorganosiloxanes in particular contain fine-particle silica which may even be silanized. Silica-containing dimethyl polysiloxanes are particularly suitable for the purposes of the invention. The polydiorganosiloxanes advantageously have a Brookfield viscosity at 25° C. (spindle 1, 10 r.p.m.) of 5,000 mPas to 30,000 mPas and, more particularly, 15,000 mPas to 25,000 mPas. The silicones are preferably used in the form of aqueous emulsions. The silicone is generally added with stirring to water. If desired, thickeners known from the prior art may be added to the aqueous silicone emulsions to increase their viscosity. These known thickeners may be inorganic and/or organic materials, particularly preferred thickeners being nonionic cellulose ethers, such as methyl cellulose, ethyl cellulose and mixed ethers, such as methyl hydroxyethyl cellulose, methyl hydroxypropyl cellulose, methyl hydroxybutyl cellulose and anionic carboxycellulose types, such as carboxymethyl cellulose sodium salt (CMC). Particularly suitable thickeners are mixtures of CMC and nonionic cellulose ethers in a ratio by weight of 80:20 to 40:60 and more particularly 75:25 to 60:40. In general, concentrations of ca. 0.5 to 10 and more particularly 2.0 to 6% by weight—expressed as thickener mixture and based on aqueous silicone emulsion—are recommended, particularly where the described thickener mixtures are added. The content of silicones of the described type in the aqueous emulsions is advantageously in the range from 5 to 50% by weight and more particularly in the range from 20 to 40% by weight, expressed as silicone and based on aqueous emulsion. In another advantageous embodiment, the aqueous silicone solutions contain starch from natural sources, for example from rice, potatoes, corn and wheat, as thickener. The starch is advantageously present in quantities of 0.1 to 50% by weight, based on silicone emulsion, and more particularly in admixture with the already described thickeners of sodium carboxymethyl cellulose and a nonionic cellulose ether in the quantities already mentioned. The aqueous silicone emulsions are preferably prepared by preswelling the thickeners present, if any, before adding the silicones. The silicones are preferably incorporated using effective mixers and stirrers.

Disintegrators

The solid preparations may additionally contain disintegrating agents (disintegrators). Disintegrators are substances which are added to the shaped bodies to accelerate their disintegration on contact with water. Disintegrators are reviewed, for example, in J. Pharm. Sci. 61 (1972), in R ömpp Chemielexikon, 9th Edition, Vol. 6, page 4440 and in Voigt "*Lehrbuch der pharmazeutischen Technolgie*" (6th Edition, 1987, pp. 182–184). These substances are capable of undergoing an increase in volume on contact with water so that, on the one hand, their own volume is increased (swelling) and, on the other hand, a pressure can be generated through the release of gases which causes the tablet to disintegrate into relatively small particles. Well-known disintegrators are, for example, carbonate/citric acid systems, although other organic acids may also be used. Swelling disintegration aids are, for example, synthetic polymers, such as polyvinyl pyrrolidone (PVP), or natural polymers and modified natural substances, such as cellulose and starch and derivatives thereof, alginates or casein derivatives. According to the invention, preferred disintegrators are cellulose-based disintegrators. Pure cellulose has the formal empirical composition $(C_6H_{10}O_5)_n$ and, formally, is a β-1,4-polyacetal of cellobiose which, in turn, is made up of two molecules of glucose. Suitable celluloses consist of ca. 500 to 5,000 glucose units and, accordingly, have average molecular weights of 50,000 to 500,000. According to the invention, cellulose derivatives obtainable from cellulose by polymer-analog reactions may also be used as cellulose-based disintegrators. These chemically modified celluloses include, for example, products of esterification or etherification reactions in which hydroxy hydrogen atoms have been substituted. However, celluloses in which the hydroxy groups have been replaced by functional groups that are not attached by an oxygen atom may also be used as cellulose derivatives. The group of cellulose derivatives includes, for example, alkali metal celluloses, carboxymethyl cellulose (CMC), cellulose esters and ethers and aminocelluloses. The cellulose derivatives mentioned are preferably not used on their own, but rather in the form of a mixture with cellulose as cellulose-based disintegrators. The content of cellulose derivatives in mixtures such as these is preferably below 50% by weight and more preferably below 20% by weight, based on the cellulose-based disintegrator. In one particularly preferred embodiment, pure cellulose free from cellulose derivatives is used as the cellulose-based disintegrator. Microcrystalline cellulose may be used as another cellulose-based disintegration aid or as part of such a component. This microcrystalline cellulose is obtained by partial hydrolysis of celluloses under conditions which only attack and completely dissolve the amorphous regions (ca. 30% of the total cellulose mass) of the celluloses, but leave the crystalline regions (ca. 70%) undamaged. Subsequent de-aggregation of the microfine celluloses formed by hydrolysis provides the microcrystalline celluloses which have primary particle sizes of ca. 5 μm and which can be compacted, for example, to granules with a mean particle size of 200 μm. Viewed macroscopically, the disintegrators may be homogeneously distributed in the granules although, when observed under a microscope, they form zones of increased concentration due to their production. Disintegrators which may be present in accordance with the invention such as, for example, collodion, alginic acid and alkali metal salts thereof, amorphous or even partly crystalline layer silicates (bentonites), polyacrylates, polyethylene glycols can be found, for example, in WO 98/40462 (Rettenmaier), WO 98/55583 and WO 98/55590 (Unilever) and WO 98/40463, DE 19709991 and DE 19710254 (Henkel). Reference is specifically made to the teaching of these documents. The shaped bodies may contain the disintegrators in quantities of 0.1 to 25% by weight, preferably in quantities of 1 to 20% by weight and more particularly in quantities of 5 to 15% by weight, based on the shaped bodies.

Perfumes

Suitable perfume oils or perfumes include individual perfume compounds, for example synthetic products of the ester, ether, aldehyde, ketone, alcohol and hydrocarbon type. Perfume compounds of the ester type are, for example, benzyl acetate, phenoxyethyl isobutyrate, p-tert.butyl cyclohexyl acetate, linalyl acetate, dimethyl benzyl carbinyl acetate, phenyl ethyl acetate, linalyl benzoate, benzyl formate, ethyl methyl phenyl glycinate, allyl cyclohexyl propionate, styrallyl propionate and benzyl salicylate. The ethers include, for example, benzyl ethyl ether; the aldehydes include, for example, the linear alkanals containing 8 to 18 carbon atoms, citral, citronellal, citronellyloxyacetaldehyde, cyclamen aldehyde, hydroxycitronellal, lilial and bourgeonal; the ketones include, for example, the ionones, α-isomethyl ionone and methyl cedryl ketone; the alcohols include anethol, citronellol, eugenol, geraniol, linalool, phenyl ethyl alcohol and terpineol and the hydrocarbons include, above all, the terpenes, such as limonene and pinene. However, mixtures of various perfumes which together produce an attractive perfume note are preferably used. Perfume oils such as these may also contain natural perfume mixtures obtainable from vegetable sources, for example pine, citrus, jasmine, patchouli, rose or ylang-ylang oil. Also suitable are clary oil, camomile oil, clove oil, melissa oil, mint oil, cinnamon leaf oil, lime blossom oil, juniper berry oil, vetiver oil, olibanum oil, galbanum oil and ladanum oil and orange blossom oil, neroli oil, orange peel oil and sandalwood oil.

The perfumes may be directly incorporated in the detergents/cleaning compositions according to the invention, although it can also be of advantage to apply the perfumes to supports which strengthen the adherence of the perfume to the washing and which provide the textiles with a long-lasting fragrance through a slower release of the perfume. Suitable support materials are, for example, cyclodextrins, the cyclodextrin/perfume complexes optionally being coated with other auxiliaries.

Inorganic Salts

Other suitable ingredients of the detergents/cleaning compositions are water-soluble inorganic salts, such as bicarbonates, carbonates, amorphous silicates, normal waterglasses with no pronounced builder properties or mixtures thereof. One particular embodiment is characterized by the use of alkali metal carbonate and/or amorphous alkali metal silicate, above all sodium silicate with a molar $Na_2O:SiO_2$ ratio of 1:1 to 1:4.5 and preferably 1:2 to 1:3.5. The sodium carbonate content of the final detergents/cleaning compositions is preferably up to 40% by weight and advantageously from 2 to 35% by weight. The content of sodium silicate (without particular building properties) in the detergents/cleaning compositions is generally up to 10% by weight and preferably between 1 and 8% by weight. In addition, sodium sulfate, for example, may be present as a filler in quantities of 0 to 10 and more particularly 1 to 5% by weight, based on the particular composition.

Production of the Detergents

The detergents obtainable using the additives according to the invention may be produced and used in the form of powders, extrudates, granules or agglomerates. They may be both heavy-duty and light-duty detergents or detergents for colored fabrics, optionally in the form of compactates or supercompactates. Compositions such as these may be produced by any of the corresponding processes known in the art. They are preferably produced by mixing together various particulate components containing detergent ingredients. The particulate components may be produced by spray drying, simple mixing or complex granulation processes, for example fluidized-bed granulation. In one particularly preferred embodiment, at least one surfactant-containing component is produced by fluidized-bed granulation. In another particularly preferred embodiment, aqueous preparations of the alkali metal silicate and alkali metal carbonate are sprayed in a dryer together with other detergent ingredients, drying optionally being accompanied by granulation.

Spray Drying

The dryer into which the aqueous preparation is sprayed can be any type of dryer. In one preferred embodiment of the process, drying is carried out by spray drying in a drying tower. In this case, the aqueous preparations are exposed in known manner to a stream of drying gas in fine-particle form. Applicants describe an embodiment of spray drying using superheated steam in a number of published patents. The operating principle disclosed in those publications is hereby specifically included as part of the disclosure of the present invention. Reference is made in particular to the following publications: DE 40 30 688 A1 and the further developments according to DE 42 04 035 A1; DE42 04 090 A1; DE 42 06 050 A1; DE 42 06 521 A1; DE 42 06 495 A1; DE 42 08 773 A1; DE 42 09 432 A1 and DE 42 34 376 A1. This process was introduced in connection with the production of the defoamer granules.

Fluidized Bed Granulation

A particularly preferred process for the production of the surfactant granules comprises subjecting the mixtures to fluidized bed granulation ("SKET" granulation). SKET fluidized bed granulation is understood to be a simultaneous granulation and drying process preferably carried out in batches or continuously. The mixtures of surfactants and disintegrating agents may be used both in dried form and in the form of a water-containing preparation. Preferred fluidized-bed arrangements have base plates measuring 0.4 to 5 m. The SKET granulation is preferably carried out at fluidizing air flow rates of 1 to 8 m/s. The granules are preferably discharged from the fluidized bed via a sizing stage. Sizing may be carried out, for example, by means of a sieve or by an air stream flowing in countercurrent (sizing air) which is controlled in such a way that only particles beyond a certain size are removed from the fluidized bed while smaller particles are retained in the fluidized bed. The inflowing air is normally made up of the heated or unheated sizing air and the heated bottom air. The temperature of the bottom air is between 80 and 400□C. and preferably between 90 and 350□C. A starting material, preferably surfactant granules from an earlier test batch, is advantageously introduced at the beginning of the granulation process.

Press Agglomeration

In another preferred variant, particularly where detergents/cleaning compositions of high bulk density are to be obtained, the mixtures are subsequently subjected to a compacting step, other ingredients being added to the detergents after this compacting step. In one preferred embodiment of the invention, the ingredients are compacted in a press agglomeration process. The press agglomeration process to which the solid premix (dried basic detergent) is subjected may be carried out in various agglomerators. Press agglomeration processes are classified according to the type of agglomerator used. The four most common press agglomeration processes—which are preferred to the purposes of the invention—are extrusion, roll compacting, pelleting and tabletting, so that preferred agglomeration processes for the purposes of the present invention are extrusion, roll compacting, pelleting and tabletting processes.

One feature common to all these processes is that the premix is compacted and plasticized under pressure and the individual particles are pressed against one another with a reduction in porosity and adhere to one another. In all the processes (but with certain limitations in the case of tabletting), the tools may be heated to relatively high temperatures or may be cooled to dissipate the heat generated by shear forces.

In all the processes, one or more binders may be used as (a) compacting auxiliary(ies). However, it must be made clear at this juncture that, basically, several different binders and mixtures of various binders may also be used. A preferred embodiment of the invention is characterized by the use of a binder which is completely in the form of a melt at temperatures of only at most 130° C., preferably at most 100° C. and more preferably up to 90° C. In other words, the binder will be selected according to the process and the process conditions or, alternatively, the process conditions and, in particular, the process temperature will have to be adapted to the binder if it is desired to use a particular binder.

The actual compacting process is preferably carried out at processing temperatures which, at least in the compacting step, at least correspond to the temperature of the softening point if not to the temperature of the melting point of the binder. In one preferred embodiment of the invention, the process temperature is significantly above the melting point or above the temperature at which the binder is present as a melt. In a particularly preferred embodiment, however, the process temperature in the compacting step is no more than 20° C. above the melting temperature or the upper limit to the melting range of the binder. Although, technically, it is quite possible to adjust even higher temperatures, it has been found that a temperature difference in relation to the melting temperature or to the softening temperature of the binder of 20° C. is generally quite sufficient and even higher temperatures do not afford additional advantages. Accordingly it is particularly preferred, above all on energy grounds, to carry out the compacting step above, but as close as possible to, the melting point or rather to the upper temperature limit of the melting range of the binder. Controlling the temperature in this way has the further advantage that even heat-sensitive raw materials, for example peroxy bleaching agents, such as perborate and/or percarbonate, and also enzymes, can be processed increasingly without serious losses of active substance. The possibility of carefully controlling the temperature of the binder, particularly in the crucial compacting step, i.e. between mixing/homogenizing of the premix and shaping, enables the process to be carried out very favorably in terms of energy consumption and with no damaging effects on the heat-sensitive constituents of the premix because the premix is only briefly exposed to the relatively high temperatures. In preferred press agglomeration processes, the working tools of the press agglomerator (the screw(s) of the extruder, the roller(s) of the roll compactor and the pressure roller(s) the pellet press) have a temperature of at most 150° C., preferably of at most 100° C. and, in a particularly preferred embodiment, at most 75° C., the process temperature being 30° C. and, in a particularly preferred embodiment, at most 20° C. above the melting temperature or rather the upper temperature limit to the melting range of the binder. The heat exposure time in the compression zone of the press agglomerators is preferably at most 2 minutes and, more preferably, between 30 seconds and 1 minute.

Preferred binders which may be used either individually or in the form of mixtures with other binders are polyethylene glycols, 1,2-polypropylene glycols and modified polyethylene glycols and polypropylene glycols. The modified polyalkylene glycols include, in particular, the sulfates and/or the disulfates of polyethylene glycols or polypropylene glycols with a relative molecular weight of 600 to 12,000 and, more particularly, in the range from 1,000 to 4,000. Another group consists of mono- and/or disuccinates of polyalkylene glycols which, in turn, have relative molecular weights of 600 to 6,000 and, preferably, in the range from 1,000 to 4,000. A more detailed description of the modified polyalkylene glycol ethers can be found in the disclosure of International patent application WO 93/02176. In the context of the present invention, polyethylene glycols include polymers which have been produced using $C_{3-5}$ glycols and also glycerol and mixtures thereof besides ethylene glycol as starting molecules. In addition, they also include ethoxylated derivatives, such as trimethylol propane containing 5 to 30 EO. The polyethylene glycols preferably used may have a linear or branched structure, linear polyethylene glycols being particularly preferred. Particularly preferred polyethylene glycols include those having relative molecular weights in the range from 2,000 to 12,000 and, advantageously, around 4,000. Polyethylene glycols with relative molecular weights below 3,500 and above 5,000 in particular may be used in combination with polyethylene glycols having a relative molecular weight of around 4,000. More than 50% by weight of such combinations may advantageously contain polyethylene glycols with a relative molecular weight of 3,500 to 5,000, based on the total quantity of polyethylene glycols. However, polyethylene glycols which, basically, are present as liquids at room temperature/1 bar pressure, above all polyethylene glycol with a relative molecular weight of 200, 400 and 600, may also be used as binders. However, these basically liquid polyethylene glycols should only be used in the form of a mixture with at least one other binder, this mixture again having to satisfy the requirements according to the invention, i.e. it must have a melting point or softening point at least above 45° C. Other suitable binders are low molecular weight polyvinyl pyrrolidones and derivatives thereof with relative molecular weights of up to at most 30,000. Relative molecular weight ranges of 3,000 to 30,000, for example around 10,000, are preferred. Polyvinyl pyrrolidones are preferably not used as sole binder, but in combination with other binders, more particularly in combination with polyethylene glycols.

Immediately after leaving the production unit, the compacted material preferably has temperatures of not more than 90° C., temperatures of 35 to 85° C. being particularly preferred. It has been found that exit temperatures—above all in the extrusion process—of 40 to 80° C., for example up to 70° C., are particularly advantageous.

Extrusion

In one preferred embodiment of the invention, the detergent according to the invention is produced by extrusion as described, for example in European patent EP 0 486 592 B1 or International patent applications WO 93/02176 and WO 94/09111 or WO 98/12299. In this extrusion process, a solid premix is extruded under pressure to form a strand and, after emerging from the multiple-bore extrusion die, the strands are cut into granules of predetermined size by means of a cutting unit. The solid, homogeneous premix contains a plasticizer and/or lubricant of which the effect is to soften the premix under the pressure applied or under the effect of specific energy, so that it can be extruded. Preferred plasticizers and/or lubricants are surfactants and/or polymers. Particulars of the actual extrusion process can be found in the above-cited patents and patent applications to which reference is hereby expressly made. In one preferred embodiment of the invention, the premix is delivered, preferably continuously, to a planetary roll extruder or to a twin-screw extruder with co-rotating or contra-rotating screws, of which the barrel and the extrusion/granulation head can be heated to the predetermined extrusion temperature. Under the shear effect of the extruder screws, the premix is compacted under a pressure of preferably at least 25 bar or—with extremely high throughputs—even lower, depending on the apparatus used, plasticized, extruded in the form of fine strands through the multiple-bore extrusion die in the extruder head and, finally, size-reduced by means of a rotating cutting blade, preferably into substantially spherical or cylindrical granules. The bore diameter of the multiple-bore extrusion die and the length to which the strands are cut are adapted to the selected granule size. In this embodiment, granules are produced in a substantially uniformly predeterminable particle size, the absolute particle sizes being adaptable to the particular application envisaged. In general, particle diameters of up to at most 0.8 cm are preferred. Important embodiments provide for the production of uniform granules in the millimeter range, for example in the range from 0.5 to 5 mm and more particularly in the range from about 0.8 to 3 mm. In one important embodiment, the length-to-diameter ratio of the primary granules is in the range from about 1:1 to about 3:1. In another preferred embodiment, the still plastic primary granules are subjected to another shaping process step in which edges present on the crude extrudate are rounded off so that, ultimately, spherical or substantially spherical extrudate granules can be obtained. If desired, small quantities of drying powder, for example zeolite powder, such as zeolite NaA powder, can be used in this step. This shaping step may be carried out in commercially available spheronizing machines. It is important in this regard to ensure that only small quantities of fines are formed in this stage. According to the present invention, drying—which is described as a preferred embodiment in the prior art documents cited above—may be carried out in a subsequent step but is not absolutely essential. It may even be preferred not to carry out drying after the compacting step. Alternatively, extrusion/compression steps may also be carried out in low-pressure extruders, in a Kahl press (manufacturer: Amandus Kahl) or in a so-called Bextruder (manufacturer: Bepex). In one particularly preferred embodiment of the invention, the temperature prevailing in the transition section of the screw, the pre-distributor and the extrusion die is controlled in such a way that the melting temperature of the binder or rather the upper limit to the melting range of the binder is at least reached and preferably exceeded. The temperature exposure time in the compression section of the extruder is preferably less than 2 minutes and, more particularly, between 30 seconds and 1 minute.

Roll Compacting

The detergents according to the invention may also be produced by roll compacting. In this variant, the premix is introduced between two rollers—either smooth or provided with depressions of defined shape—and rolled under pressure between the two rollers to form a sheet-like compactate. The rollers exert a high linear pressure on the premix and may be additionally heated or cooled as required. Where smooth rollers are used, smooth untextured compactate sheets are obtained. By contrast, where textured rollers are used, correspondingly textured compactates, in which for example certain shapes can be imposed in advance on the subsequent detergent particles, can be produced. The sheet-like compactate is then broken up into smaller pieces by a chopping and size-reducing process and can thus be processed to granules which can be further refined and, more particularly, converted into a substantially spherical shape by further surface treatment processes known per se. In roll compacting, too, the temperature of the pressing tools, i.e. the rollers, is preferably at most 150° C., more preferably at most 100° C. and most preferably at most 75° C. Particularly preferred production processes based on roll compacting are carried out at temperatures 10° C. and, in particular, at most 5° C. above the melting temperature of the binder or the upper temperature limit of the melting range of the binder. The temperature exposure time in the compression section of the rollers—either smooth or provided with depressions of defined shape—is preferably at most 2 minutes and, more particularly, between 30 seconds and 1 minute.

Pelleting

The detergents according to the invention may also be produced by pelleting. In this process, the premix is applied to a perforated surface and is forced through the perforations and at the same time plasticized by a pressure roller. In conventional pellet presses, the premix is compacted under pressure, plasticized, forced through a perforated surface in the form of fine strands by means of a rotating roller and, finally, is size-reduced to granules by a cutting unit. The pressure roller and the perforated die may assume many different forms. For example, flat perforated plates are used, as are concave or convex ring dies through which the material is pressed by one or more pressure rollers. In perforated-plate presses, the pressure rollers may also be conical in shape. In ring die presses, the dies and pressure rollers may rotate in the same direction or in opposite directions. A press suitable for carrying out the process according to the invention is described, for example, in DE 38 16 842 A1. The ring die press disclosed in this document consists of a rotating ring die permeated by pressure bores and at least one pressure roller operatively connected to the inner surface thereof which presses the material delivered to the die space through the pressure bores into a discharge unit. The ring die and pressure roller are designed to be driven in the same direction which reduces the shear load applied to the premix and hence the increase in temperature which it undergoes. However, the pelleting process may of course also be carried out with heatable or coolable rollers to enable the premix to be adjusted to a required temperature. In pelleting, too, the temperature of the pressing tools, i.e. the pressure rollers, is preferably at most 150° C., more preferably at most 100° C. and most preferably at most 75° C. Particularly preferred production processes based on pelleting are carried out at temperatures 10° C. and, in particular, at most 5° C. above the melting temperature of the binder or the upper temperature limit of the melting range of the binder.

Tabletting

The production of shaped bodies, preferably those in tablet form, is generally carried out by tabletting or press agglomeration. The particulate press agglomerates obtained may either be directly used as detergents or may be aftertreated beforehand by conventional methods. Conventional aftertreatments include, for example, powdering with fine-particle detergent ingredients which, in general, produces a further increase in bulk density. However, another preferred aftertreatment is the procedure according to German patent applications DE 195 24 287 A1 and DE 195 47 457 A1, according to which dust-like or at least fine-particle ingredients (so-called fine components) are bonded to the particulate end products produced in accordance with the invention which serve as core. This results in the formation of detergents which contain these so-called fine components as an outer shell. Advantageously, this is again done by melt agglomeration. On the subject of the melt agglomeration of fine components, reference is specifically made to the disclosure of German patent applications DE-A-195 24 287 and DE-A-195 47 457. In the preferred embodiment of the invention, the solid detergents are present in tablet form, the tablets preferably having rounded corners and edges, above all in the interests of safer storage and transportation. The base of the tablets may be, for example, circular or rectangular in shape. Multilayer tablets, particularly tablets containing two or three layers which may even have different colors, are particularly preferred. Blue-white or green-white or blue-green-white tablets are particularly preferred. The tablets may also have compressed and non-compressed parts. Tablets with a particularly advantageous dissolving rate are obtained if, before compression, the granular constituents contain less than 20% by weight and preferably less than 10% by weight of particles outside the 0.02 to 6 mm diameter range. A particle size distribution of 0.05 to 2.0 mm is preferred, a particle size distribution of 0.2 to 1.0 mm being particularly preferred.

EXAMPLES

Example H1

In a conventional spray tower, a 55% by weight aqueous dodecyl benzenesulfonate sodium salt paste (Maranil® A55, Cognis Deutschland GmbH) was converted into droplets using a 480 mm diameter casting plate ("droplet plate", perforation diameter 0.5 mm) at a vibration frequency of 800 Hz and an excess operating pressure of 40 mbar. The droplets were dried with hot air (150° C.) flowing in countercurrent. The sprayed material was continuously discharged at the cone of the spray tower. The percentage of sprayed material below 0.5 mm in diameter was now 0.4% by weight, 68.5% by weight having a diameter of 0.8 to 1.25 mm.

Example H2

Example 1 was repeated using a 30% by weight lauryl sulfate sodium salt paste (Sulfopon® T30, Cognis Deutschland GmbH). The percentage of sprayed material below 0.5 mm in diameter was now 0.3% by weight, 70.5% by weight having a diameter of 0.8 to 1.25 mm.

Example H3

Example 1 was repeated using a 30% by weight coconut monoglyceride sodium salt paste (Plantapon® CMGS, Cognis Deutschland GmbH). The percentage of sprayed material below 0.5 mm in diameter was now 0.25% by weight, 67.3% by weight having a diameter of 0.8 to 1.25 mm.

Example H4

Example 1 was repeated using a 30% by weight coconut alkyl glucoside paste (Glucopon® 600 CS UP, Cognis Deutschland GmbH). Drying was carried out at 105° C. The percentage of sprayed material below 0.5 mm in diameter was now 0.3% by weight, 71.8% by weight having a diameter of 0.8 to 1.25 mm.

Example H5

Example 1 was repeated using a 30% by weight coconut alkyl glucoside/coconut alcohol+2 EO sulfate sodium salt paste (Plantacare® PS 10, Cognis Deutschland GmbH). Drying was carried out at 108° C. The percentage of sprayed material below 0.5 mm in diameter was now 0.35% by weight, 74.2% by weight having a diameter of 0.8 to 1.25 mm.

Example H6

Example 1 was repeated using a 30% by weight lauric acid-N-methyl glucamide paste. Drying was carried out at 105° C. The percentage of sprayed material below 0.5 mm in diameter was now 0.3% by weight, 71.8% by weight having a diameter of 0.8 to 1.25 mm.

Example H7

Example 1 was repeated using a 45% by weight Cocamidopropylbetaine paste (Dehyton® PK, Cognis Deutschland GmbH). The percentage of sprayed material below 0.5 mm in diameter was now 0.5% by weight, 71.0% by weight having a diameter of 0.8 to 1.25 mm.

Performance tests. Surfactant granules H1 and H2 according to the invention and two commercially available granular surfactants were used in detergent formulations. To determine solubility, quantities of 20 g of washing powder were added with continuous stirring to 1 liter of water at 15° C. The solution was filtered through a sieve (mesh width 0.1 mm) after 60 s (T1), 120 s (T2) and 300 s (T3). The filter residue was dried in air for one hour and weighed. The results are set out in Table 1.

The detergent formulations were all similarly tabletted after addition of 7 g of microcrystalline compacted cellulose (tablet weight 40 g, constant fracture hardness). The tablets obtained were hermetically packed and then stored for 2 weeks at 40° C. To evaluate dissolving behavior, the tablets were placed on a wire rack standing in water (0° d, 25° C.). The tablets were completely surrounded by water. The disintegration time from immersion to complete dissolution was measured. The disintegration times are also shown in Table 1.

TABLE 1

Compositions and dissolving rates (quantities in % by weight)

| Composition/performance | 1 | 2 | 3 | C1 | C2 |
|---|---|---|---|---|---|
| Dodecyl benzenesulfonate sodium salt, Example 1 | 10.0 | — | — | — | — |
| Dodecyl benzenesulfonate sodium salt* | — | — | — | 10.0 | — |
| Lauryl sulfate sodium salt, Example 2 | — | 10.0 | 10.0 | — | — |
| Lauryl sulfate sodium salt* | — | — | — | — | 10.0 |
| Coconut alcohol + 7 EO | 8.0 | 8.0 | — | 8.0 | 8.0 |
| $C_{12/18}$ coconut alkyl polyglucoside | — | — | 8.0 | — | — |
| Palm kernel oil fatty acid sodium salt | 2.0 | 2.0 | 2.0 | 2.0 | 2.0 |
| Sodium silicate | 2.0 | 2.0 | 2.0 | 2.0 | 2.0 |
| Sodium carbonate | 13.0 | 13.0 | 13.0 | 13.0 | 13.0 |
| Zeolite A | 26.0 | 26.0 | 26.0 | 26.0 | 26.0 |
| Polycarboxylate | 3.0 | 3.0 | 3.0 | 3.0 | 3.0 |
| Sodium percarbonate | 15.0 | 15.0 | 15.0 | 15.0 | 15.0 |
| Silicone defoamer | 2.0 | 2.0 | 2.0 | 2.0 | 2.0 |
| TAED | 4.0 | 4.0 | 4.0 | 4.0 | 4.0 |
| CMC | 2.0 | 4.0 | 4.0 | 4.0 | 4.0 |
| Sodium sulfate, water | | | to 100 | | |
| Residual quantity of washing powder [g] | | | | | |
| -T0 | 20.0 | 21.0 | 20.0 | 20.0 | 20.0 |
| -T1 | 14.0 | 15.0 | 15.0 | 18.0 | 18.0 |
| -T2 | 8.0 | 8.0 | 8.0 | 15.0 | 14.0 |
| -T3 | — | — | | 4.0 | 4.0 |
| Tablet disintegration time [s] | 32 | 30 | 35 | >200 | 150 |

*commercially available granular surfactants

What is claimed is:

1. A process for preparing surfactant granules, said process comprising:

(a) passing a water-containing surfactant preparation through a casting plate, wherein the casting plate vibrates, such that droplets of the preparation are formed; and (b) contacting the droplets with a gaseous diying agent.

2. The process according to claim 1, wherein the casting plate comprises a perforated disk.

3. The process according to claim 2, wherein the perforated disk has a mean perforation diameter of from 0.5 to 1.4 mm.

4. The process according to claim 1, wherein the casting plate vibrates at a frequency of from 100 to 1000 Hz.

5. The process according to claim 2, wherein the casting plate vibrates at a frequency of from 100 to 1000 Hz.

6. The process according to claim 3, wherein the casting plate vibrates at a frequency of from 100 to 1000 Hz.

7. The process according to claim 1, wherein the casting plate vibrates at a frequency of from 500 to 800 Hz.

8. The process according to claim 2, wherein the casting plate vibrates at a frequency of from 500 to 800 Hz.

9. The process according to claim 3, wherein the casting plate vibrates at a frequency of from 500 to 800 Hz.

10. The process according to claim 1, wherein the water-containing surfactant preparation comprises an anionic surfactant selected from the group consisting of alkyl benzenesulfonates, alkyl sulfates, alkyl ether sulfates, alkanesulfonates, olefin sulfonates, methyl ester sulfonates, monoglyceride(ether)sulfates and alkali soaps.

11. The process according 1, wherein the water-containing surfactant preparation comprises a nonionic surfactant selected from the group consisting of fatty alcohol polyglycol ethers, alkoxylated fatty acid lower alkyl esters, alkyl oligoglucosides and fatty acid-N-alkyl polyhydroxyailcyl amides.

12. The process according to claim 1, wherein the water-containing surfactant preparation comprises a cationic surfactant selected from the group consisting of tetraalkyl ammonium compounds and esterquats.

13. The process according to claim 1, wherein the water-containing surfactant preparation comprises a surfactant selected from the group consisting of alkyl betaines, fatty acid amidoamine betaines and imidazolinium betaines.

14. The process according to claim 1, wherein the water-containing surfactant preparation comprises a surfactant with a solids concentration of from 1 to 70% by weight.

* * * * *